United States Patent [19]

Wada et al.

[11] Patent Number: 5,119,216

[45] Date of Patent: * Jun. 2, 1992

[54] ELECTRO-OPTICAL DEVICE

[75] Inventors: Hiroshi Wada; Chiyoaki Iijima; Hiroshi Ohara; Yoichi Momose, all of Suwa, Japan

[73] Assignee: Seiko Epson Corporation, Tokyo, Japan

[*] Notice: The portion of the term of this patent subsequent to Jul. 4, 2006 has been disclaimed.

[21] Appl. No.: 282,222

[22] Filed: Dec. 9, 1988

Related U.S. Application Data

[63] Continuation-in-part of Ser. No. 052,816, May 19, 1987.

[30] Foreign Application Priority Data

Dec. 10, 1987 [JP] Japan .................. 62-313076
Mar. 7, 1988 [JP] Japan .................. 63-053005

[51] Int. Cl.$^5$ .................. G02F 1/133; G02F 1/1335; G02F 1/137
[52] U.S. Cl. .................. 359/53; 359/73; 359/93; 359/102
[58] Field of Search .................. 350/335, 338, 347 E, 350/347 R, 337, 405

[56] References Cited

U.S. PATENT DOCUMENTS

| | | | |
|---|---|---|---|
| 3,923,379 | 12/1975 | Kumada | 359/250 |
| 4,099,855 | 7/1978 | Wisbey et al. | 359/55 |
| 4,232,948 | 11/1980 | Shanks | 359/53 |
| 4,268,127 | 5/1981 | Oshima et al. | 350/337 |
| 4,443,065 | 4/1984 | Funada et al. | 359/53 |
| 4,548,479 | 10/1985 | Yeh | 359/458 |
| 4,664,482 | 5/1987 | Kando et al. | 359/63 |
| 4,715,686 | 12/1987 | Iwashita et al. | 359/63 |
| 4,844,569 | 7/1989 | Wada et al. | 350/347 E |
| 4,904,058 | 2/2990 | Kato et al. | 350/335 |
| 4,906,073 | 3/1990 | Hunahata et al. | 350/335 |
| 4,909,606 | 3/1990 | Wada et al. | 350/335 |
| 4,952,029 | 8/1990 | Hayashi et al. | 350/347 R |

FOREIGN PATENT DOCUMENTS

| | | | |
|---|---|---|---|
| 0051858 | 4/1979 | Japan | 350/337 |
| 0174819 | 10/1984 | Japan | 350/338 |
| 2145837 | 4/1985 | United Kingdom . | |

OTHER PUBLICATIONS

H. A. Tarry, "Electricaslly Tunable Narrowband Optical Filter", *Electroncis Letters*, vol. 11, No. 19, Sep. 18, 1975, pp. 471, 472.

*Primary Examiner*—John S. Meyman
*Assistant Examiner*—Anita Pellman Gross
*Attorney, Agent, or Firm*—Blum Kaplan

[57] ABSTRACT

An electro-optical device which includes a super twisted nematic liquid crystal display cell and a compensating cell disposed between a pair of polarizers. Each of these cells is characterized by a plurality of parameters including refractive index dispersion, refractive index anisotropy, layer thickness and twist angle. At least one of the parameters characterizing the liquid crystal display cell differs in value from the corresponding parameter characterizing the compensating cell.

49 Claims, 14 Drawing Sheets

ELECTRO-OPTICAL DEVICE

CROSS-REFERENCE TO RELATED APPLICATION

This application is a continuation-in-part of U.S. patent application Ser. No. 07/052,816, filed on May 19, 1987.

BACKGROUND OF THE INVENTION

This invention relates generally to an electro-optical device, and more particularly to an electro-optical device which includes a field effect type liquid crystal display cell and an anisotropic material disposed between a pair of polarizers.

Conventional electro-optical devices which include super twisted nematic (STN) liquid crystal cells exhibit other than substantially flat transmittance characteristics with respect to wavelength. Such non-flat transmittance characteristics in a positive type display cause white light to be displayed as green, yellowish green, yellow or reddish yellow when the device is turned off and blue or dark blue when the device is turned on. Similarly, white light passing through a negative type display device will be displayed as blue or dark blue when turned off and yellow when the device is turned on. In other words, conventional electro-optical devices operating in a STN mode are unable to display monochromatic black and white from white incident light.

To prevent such coloring, use of an achromatic, optically anisotropic substance or other type of compensating cell can be used. More particularly, light rays divided by double refraction occurring within the STN liquid crystal cell cause linealy polarized light to become elliptically polarized light. By passing the elliptically polarized light through the optically anisotropic substance the colored light is converted once again to white light. In other words, the optically anisotropic substance serves to compensate for coloring caused by the double refraction of light rays passing through the STN liquid crystal cell.

As shown in FIG. 3, an electro-optical device 50 employing a conventional STN mode of operation includes an analyzer or polarizer 1, a compensating cell 2, a STN liquid crystal cell 3 and a polarizer 4. An incident light 25 initially enters device 50 through polarizer 4 and leaves device 50 through analyzer 1. Incident light 25 is neither polarized nor homogeneous and includes a plurality of light rays 251 which are substantially perpendicular to the direction of propagation. Analyzer 1 has an axis of polarization 19 which is substantially perpendicular to an axis of polarization 18 of polarizer 4. As incident light 25 passes through polarizer 4, incident light 25 becomes a linearly polarized light 26 which includes different wavelengths such as, but not limited to, light of a blue wavelength 261, a green wavelength 262 and a red wavelength 263. All wavelengths of linearly polarized light 26 propagate in substantially the same direction as the direction of polarizing axis 18.

As linearly polarized light 26 passes through STN liquid crystal cell 3, linearly polarized light 26 is transformed to an elliptically polarized light 27. More particularly, a plurality of light rays 261, 262 and 263 of linearly polarized light 26 are transformed into a plurality of elliptically polarized light rays 271, 272 and 273, respectively, based on the birefringence of STN cell 3. Each elliptically polarized light ray differs in its state (e.g. direction of its axes) according to its wavelength (i.e. color). Assuming for a moment that device 50 does not include compensating cell 2, elliptically polarized light 27 then would be fed directly to analyzer 1. The amount of light transmitted through analyzer 1 depends on how much of the wavelength (i.e. color) of each light ray within elliptically polarized light 27 is in the same direction as polarizing axis 19. Since each of the wavelengths differ in state, a light 29 emitted from analyzer 1 would be colored, that is, other than white even though incident light 25 enters device 50 as white light. Such coloring can be avoided by passing polarized light 27 through compensating cell 2. The elliptically polarized light rays of light 27 are converted back to a linearly polarized light 28. Linearly polarized light 28 includes, but is not limited to, light of wavelengths 281, 282 and 283 which correspond to light of wavelengths 271, 272 and 273, respectively. When the direction of linearly polarized light 28 is substantially perpendicular to the direction of polarizing axis 19 of analyzer 1 (i.e. when no voltage is applied to STN liquid crystal cell 3), very little, if any portion of linearly polarized light 28 passes through analyzer 1. Therefore, black characters or digits can be displayed by device 50. By applying a voltage across STN liquid crystal cell 3, the direction of linearly polarized light 28 is substantially parallel to the direction of polarizing axis 19 of analyzer 1. Accordingly, white characters or digits can be displayed by device 50.

Electro-optical device 50 requires that compensating cell 2 must be made from a liquid crystal composition which is identical to the liquid crystal composition of STN liquid crystal cell 3 with respect to material, layer thickness (i.e. cell gap) and twist angle to provide a colorless, substantially perfect black and white (i.e. monochromatic) display. The liquid crystal material of compensating cell 2 also must be twisted in a direction opposite to the direction in which the liquid crystal material of STN liquid crystal cell 3 is twisted.

The optical path travelled during double refraction is defined as the product of an anisotropy ($\Delta n$) of the refractive index of a liquid crystal material and a layer of thickness d (i.e. $\Delta nd$). When compensating cell 2 and STN liquid crystal cell 3 are made from the same liquid crystal material, each has the same refractive index anisotropy $\Delta n$. Since layer thickness d (i.e. cell gap) of cells 2 and 3 are the same, the product of $\Delta nd$ for each cell is the same.

Expensive additives or other agents are typically added to the liquid crystal composition of STN liquid crystal cell 3 and compensating cell 2 to provide an acceptable level of responsiveness and suitable temperature characteristics. These additives or other agents increase the material cost and add to the manufacturing process complexity of device 50. The time required to fabricate cells 3 and 2 also increases. STN liquid crystal cell 3 is also typically made from an expensive liquid crystal material. Conventional electro-optical devices use the same expensive liquid crystal material for compensating cell 2 resulting in a further increase in material costs associated with device 50.

Until now it also has been considered that layer thickness d of compensating cell 2 must be equal to layer thickness d of STN liquid crystal cell 3. To avoid unevenness in the thickness of STN liquid crystal cell 3, extremely thin cells are avoided. Consequently, layer thickness d of compensating cell 2 cannot be extremely small.

Accordingly, it is desirable to provide an electro-optical device using a STN liquid crystal display cell and compensating cell in which the twist angles, anisotropy Δ n, layer thickness d and a refractive index dispersion α (to be discussed below) of each cell are not necessarily the same. More particularly, one or more of these parameters can differ in value in each cell while providing a suitable display with high contrast (i.e. a monochromatic black and white display). It is also desirable to provide an electro-optical device which includes a compensating cell made from a variety of different liquid crystalline materials in which the manufacturing steps for adjusting the cell gaps is simplified.

SUMMARY OF THE INVENTION

Generally speaking, in accordance with the invention, a liquid crystal display device includes a liquid crystal cell for producing a display based on application of voltage and at least one layer of an optically anisotropic substance for compensating for color generated by the liquid crystal cell disposed between crossed polarizers wherein at least one of the parameters including refractive index dispersion α, refractive index anisotropy Δ n, layer thickness d and twist angle characterizing the liquid crystal cell differs in value from the corresponding parameter characterizing the optically anisotropic material.

Incident linear polarized light passing through the first polarizer is double refracted by the liquid crystal cell and enters the optically anisotropic material as elliptically polarized light. The optically anisotropic material converts the elliptically polarized light back to linearly polarized light which depending on the polarizing axis of the second polarizer will substantially block or substantially permit all of the linearly polarized light passing through the optically anisotropic material to pass through the second polarizer. The liquid crystal cell includes a nematic liquid crystal composition having a twist angle ranging between 90° and 360°. The optically anisotropic material also includes a nematic liquid crystal composition having a twist angle between 0° to 400°.

In one embodiment of the invention the layer thickness d of the optically anisotropic material is greater than the layer thickness d of the liquid crystal cell. In another embodiment of the invention, the product of the refractive index anisotropy Δ n and layer thickness d of the optically anisotropic material (i.e. Δ nd) is less than the product of the refractive index anisotropy Δ n and layer thickness d of the liquid crystal cell (i.e. Δ nd).

Generally, refractive index anisotropy Δ n of the liquid crystal material is dependent upon the wavelength λ. As wavelength λ increases, refractive index anistropy Δ n normally decreases. The ratio of the anisotropy at a wavelength at 450 nanometers to the anisotropy at a wavelength of 590 nanometers is referred to as a refractive index dispersion α and is defined as:

$$\alpha = \Delta n(450)/\Delta n(590)$$

wherein Δ n 450) and Δ n (590) represent the refractive index anisotropies at wavelengths of 450 nanometers and 590 nanometers, respectively.

For the same liquid crystal material, refractive index dispersion α will have the same value. Different liquid crystalline materials also can exhibit the same refractive index dispersion α.

The invention can be used as a liquid crystal display, an optical shutter or the like. The molecular packing of the nematic liquid crystal composition is either twisted or oriented parallel to the front and rear planes, that is, not twisted, by well known orientation techniques. Accordingly, the invention is not limited to the twist angles described in the examples described below. Although the twist angles in the twisted nematic liquid crystal cell are preferably set between 90° and 360° based on contrast, display characteristics and manufacturing considerations, the invention is applicable to twist orientations which can be less than 90° or greater than 360°. Such twist angles can be used for both the compensating cell (i.e. optically anisotropic material) and display cell (i.e. liquid crystal cell).

Accordingly, it is an object of the invention to provide an improved electro-optical device including an STN liquid crystal material.

It is another object of the invention to provide an improved STN electro-optical device which includes a compensating cell chosen from a variety of liquid crystal materials.

It is a further object of the invention to provide an STN electro-optical device which produces monochromatic black and white displays whether or not the device is of a positive or negative type.

It is yet another object of the invention to provide an improved STN electro-optical device in which the display cell and compensating cell in which at least one of the parameters including refractive index dispersion α, refractive index Δ n, layer thickness d and twist angle characterizing the display cell differs in value from the corresponding parameter characterizing the compensating cell.

Still other object and advantages of the invention will be in part be obvious and will in part be apparent from the specification.

The invention accordingly comprises the features of construction, combination of elements and arrangements of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
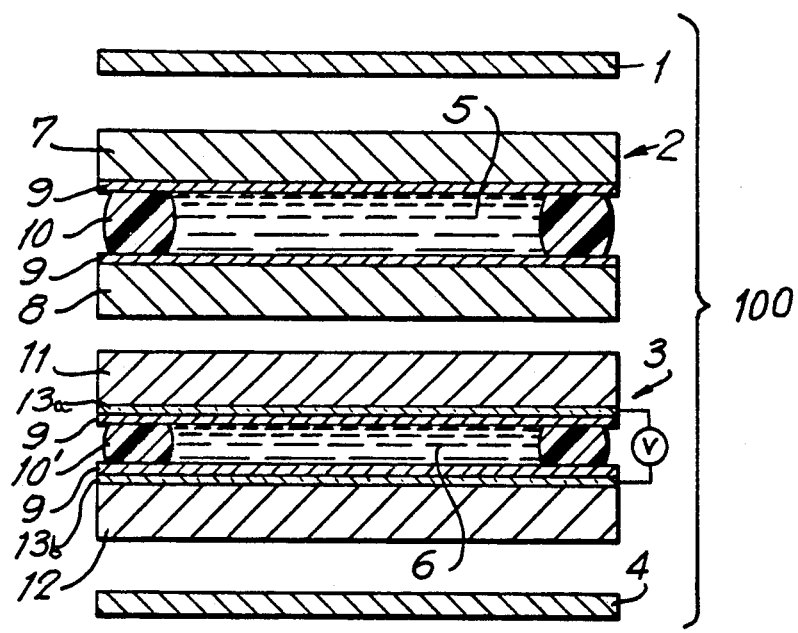
FIG. 1 is a partially exploded cross-sectional view of an electro-optical device in accordance with one embodiment of the invention.

As shown in FIG. 1, an electro-optical device 100 includes an upper polarizer 1, an optically anisotropic substance 2 (herinafter referred to as compensating cell A), a liquid crystal cell 3 (hereinafter referred to as display cell B), and a lower polarizer 4. Compensating cell A includes an upper transparent plate 7 and a cooperating lower transparent plate 8 spaced apart by spacer 10 to form a gap therebetween. A twisted nematic liquid crystal material 5 fills this gap. A pair of orientation layers 9 are formed on opposing surfaces of upper plate 7 and lower plate 8.

Display cell B includes an upper transparent plate 11 and a lower transparent plate 12 spaced apart by a spacer 10' to create a gap therebetween. A twisted nematic liquid crystal material 6 fills this gap. A first transparent electrode 13a is deposited selectively on upper plate 11. Similarly, a transparent electrode 13b is deposited on lower plate 12. Additional orientation layers 9 are deposited on opposing surfaces of opposing transparent electrodes 13a and 13b.

The surfaces of orientation layers 9 are rubbed to orient those portions of liquid crystal materials 5 and 6 which are adjacent thereto to align with the rubbing directions. When assembled, orientation layers 9 of each cell are twisted relative to one another so as to twist the liquid crystal composition selectively between these layers (hereinafter referred to as the twist angle).

The cell gaps of cells 3 are uniformly spaced between transparent electrodes 13b and 13a, by spacers 10'. Spacer 10 of cell 2 is bonded to upper plate 7 and lower plate 8 with adhesive. Similarly, spacer 10' of display cell 3 is bonded to upper plate 11 and lower plate 12 with adhesive. Device 100 can be a positive or negative type display. If desired, transparent electrodes also can be included in compensating cell A although not shown in FIG. 1. A voltage source V is connected to transparent electrodes 13a and 13b for selectively driving portions of display cell B.

Liquid crystal material 5 of compensating cell A includes a phenylcyclohexane or biphenyl liquid crystal to which an appropriate amount of optically active substance CB-15, manufactured by BDH Ltd. of Great Britain, is added. Liquid crystal material 5 forms a helical structure having a twist in the right direction, that is, rotating from compensating cell A toward display cell B. Liquid crystal material 5 can be made from either a smectic or a cholesteric structure. In the present embodiment, liquid crystal material 5 has a nematic structure with an optically active substance or a cholesteric liquid crystal structure added. Such mixtures are hereinafter referred to as nematic liquid crystals. Liquid crystal material 5 also can be made from a combination of plural nematic liquid crystals or a nematic liquid crystal to which other substances are added.

Liquid crystal material 6 of display cell B includes phenylecyclohexane to which an appropriate amount of optically active substance S-811, manufactured by Merck Patent GmbH of West Germany, is added. Liquid crystal material 6 has a helical structure which is twisted toward the left.

Polarizers 1 and 4 are each made from a polarizer $LLC_2$—81-18 which is manufactured by Sanritsu Denki K.K. of Japan. The axis of polarization (i.e. or the axis of absorption) of polarizers 1 and 4 are inclined at an angle of 45° to the direction of orientation of the adjacent substrates 7 and 12. In this embodiment, electro-optical device 100 is a negative type display. Therefore, the axis of polarization of polarizers 1 and 4 are located to the right or to the left of the orientation direction of transparent plates 7 and 12. The orientation direction of lower plate 8 of compensating cell A is perpendicular to the orientation direction of upper plate 11 of cell B. Alternatively, the orientation direction of lower plate 8 can form an angle of between 70°–110° relative to the orientation direction of upper plate 11 (i.e. a 90° need not be formed).

Figure 2:
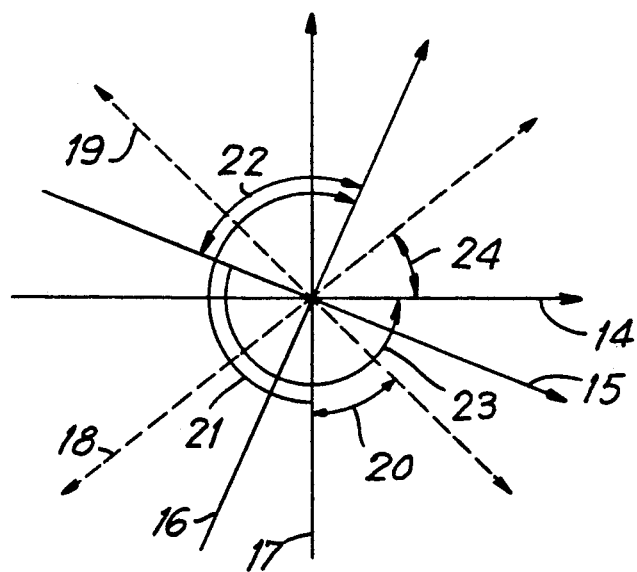
FIG. 2 diagrammatically illustrates various axial and rubbing directions of the device of FIG. 1.
Figure 3:
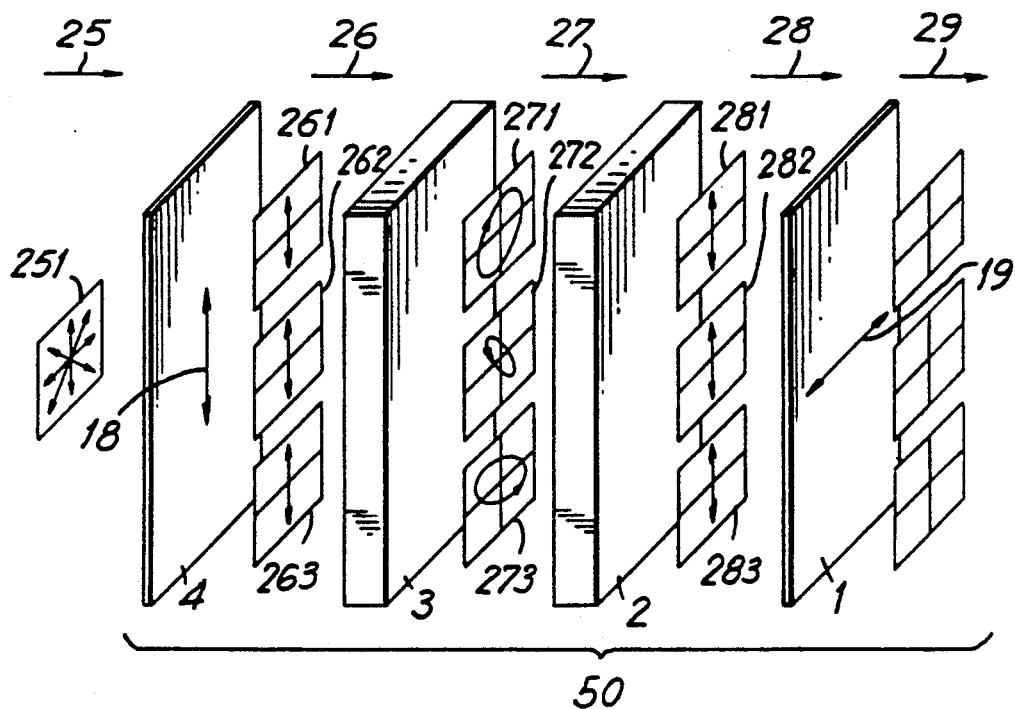
FIG. 3 is a diagramatic, exploded perspective view of a conventional electro-optical device.

FIG. 2 illustrates diagrammatically the relationship between the various axes and orienation directions of device 100. The orientation direction of lower plate 12 of cell B is in a direction denoted by an arrow 14. The orientation direction of upper plate 11 of cell B is in a direction denoted by an arrow 15. The orientation directions of lower plate 8 and upper plate 7 of compensating cell A are in directions denoted by arrows 16 and 17, respectively. The axis of polarization of lower polarizer 4 and upper polarizer 1 are represented by a pair of arrows 18 and 19, respectively. The direction of the polarizing axis of upper polarizer 1 forms an angle 20 relative to the orientation direction of upper plate 7 of cell A. Compensating cell A and display cell B have a twist angle 21 and a twist angle 23, respectively. The orienation direction of lower plate 8 of compensating cell A relative to the orientation direction of upper plate 11 of display cell B forms an angle 22. The orientation direction of lower plate 12 of display cell B relative to the axis of polarization of lower polarizer 4 forms an angle 24.

When a voltage is not applied to a field effect liquid crystal display cell (i.e. display cell B of electro-optical device 100) of the negative type, light is not transmitted through the liquid crystal cell (i.e. the cell appears black). When a voltage is applied across the selected electrode segments of display cell B, light is transmitted through the selected segments and display characters or digits will appear white on a black background. A field effect type liquid crystal cell is a positive type device and operates in a reverse manner; that is, when voltage is not applied light is transmitted and display characters and digits appear white on a black background. When a voltage is applied to the positive type display light is not transmitted (i.e. the cell appears black). Although the invention can be applied to both a positive and negative type electro optical device, this embodiment is a negative type display.

As shown in FIG. 1, compensating cell A is placed above display cell B. Alternatively, a number of layers of an optically anisotropic substance can be stacked one on top of another for converting the elliptically polarized light produced by display cell B to linearly polarized light.

In Examples 1-17 which follow, the angles and directions given refer to device 100 as shown in FIG. 2. Each of these Examples results in white light being transmitted by negative type display device 100 when a voltage is applied across opposed electrode segments in display cell B and no light being transmitted (i.e. appearing black) when a voltage is not applied across opposed electrodes in display cell B.

In several of the Examples, the layer thickness d of the optically anisotropic material is greater than the layer thickness d of the liquid crystal cell. The Examples also include results based on the product of the refractive index anisotropy $\Delta n$ and layer thickness d of the optically anisotropic material (i.e. $\Delta nd$) being less than the product of the refractive index anisotropy n and layer thickness d of the liquid crystal cell (i.e. $\Delta nd$).

Since refractive index anisotropy $\Delta n$ of the liquid crystal material is generally dependent upon the wavelength $\lambda$, as wavelength $\lambda$ increases, refractive index anisotropy $\Delta n$ normally decreases. As used in the Examples, the ratio of the anisotropy at a wavelength at 450 nanometers to the anisotropy at a wavelength of 590 nanometers is the refractive index dispersion $\alpha$ and is defined as:

$$\alpha = \Delta n(450)/\Delta n(590)$$

wherein $\Delta n$ 450) and $\Delta n$ (590) represent the refractive index anisotropies at wavelengths of 450 nanometers and 590 nanometers, respectively.

EXAMPLE 1

Figure 4:
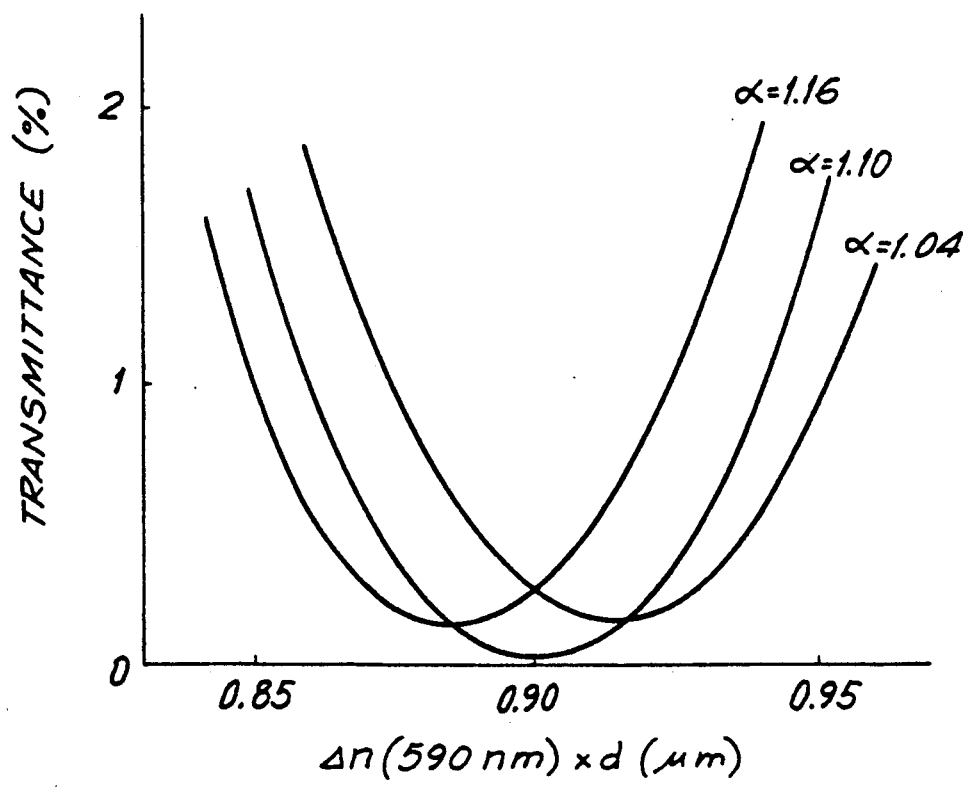
FIG. 4 is a plot of transmittance versus optical length of the compensating cell in accordance with one embodiment of the invention.

Display cell B is twisted to the left and has a twist angle of 240°, refractive index dispersion $\alpha = 1.10$ and $\Delta n(590)d = 0.9$ micrometers. Compensating cell A is twisted to the right and has a twist angle of 240°. FIG. 4 illustrates a plot of the luminous transmittance T of device 100 versus the optical length defined by $\Delta n(590)d$ of compensating cell A wherein $\Delta n(590)$ represents the refractive index anisotropy at wavelength of 590 nanometers (nm) which is multiplied by layer thickness d of compensating cell A. Three curves representing refractive index dispersion $\alpha$ equal to 1.04, 1.10 and 1.16 are shown in FIG. 4. The value of refractive index dispersion $\alpha$ was varied by adjusting the proportion of the main constituent or other constituents or by introducing an additive to liquid crystal material 5.

Luminous transmittance T was obtained by measuring the transmittance of light passing through display cell B and compensating cell A and by compensating for the transmittance at each wavelength in terms of visual sensitivity. As the value of luminous transmittance T decreases, device 100 approaches production of a monochromatic black display. In other words, the colored blue or dark blue light produced by display cell B is converted to black by compensating cell A. The minimum value of luminous transmittance T of compensating cell A is equal to 0.14% when the optical length at 590 nanometers (n.m.) = 0.89 micrometers ($\mu$m) with refractive index dispersion $\alpha = 1.16$. The conditions (i.e. (i), (ii) and (iii)) under which a minimum value of luminous transmittance $T_{min}$ is obtained for each of the curves of FIG. 4 is as follows:

| Condition | $\alpha$ | $\Delta n(590)d$ ($\mu$m) | Tmin (%) |
|---|---|---|---|
| (i) | 1.04 | 0.91 | 0.15 |
| (ii) | 1.10 | 0.90 | 0.03 |
| (iii) | 1.16 | 0.89 | 0.14 |

Figure 5:
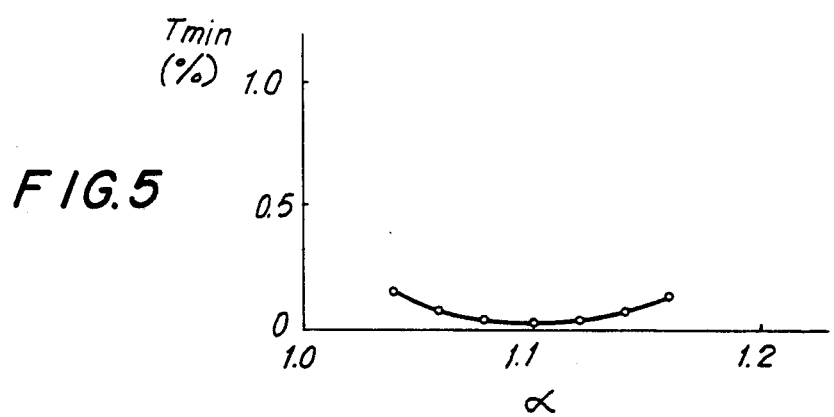
FIG. 5 is a plot of minimum transmittance versus refractive index dispersion α based on FIG. 4.

FIG. 5 illustrates the minimum values of luminous transmittance $T_{min}$ plotted against refractive index dispersion $\alpha$ of compensating cell A. The minimum value of luminous transmittance $T_{min}$ ocurs under condition (ii), that is, when refractive index dispersion $\alpha = 1.10$. Compensating cell A and display cell B have the same twist angle but are twisted in opposite directions, that is, right twist and left twist, respectively. Electro-optical device 100 produces the best results (i.e. monochromatic black) when both compensating cell A and display cell B have the same refractive index dispersion $\alpha$ and the same optical length $n(590)d$ of 0.90 $\mu$m.

Figure 6:
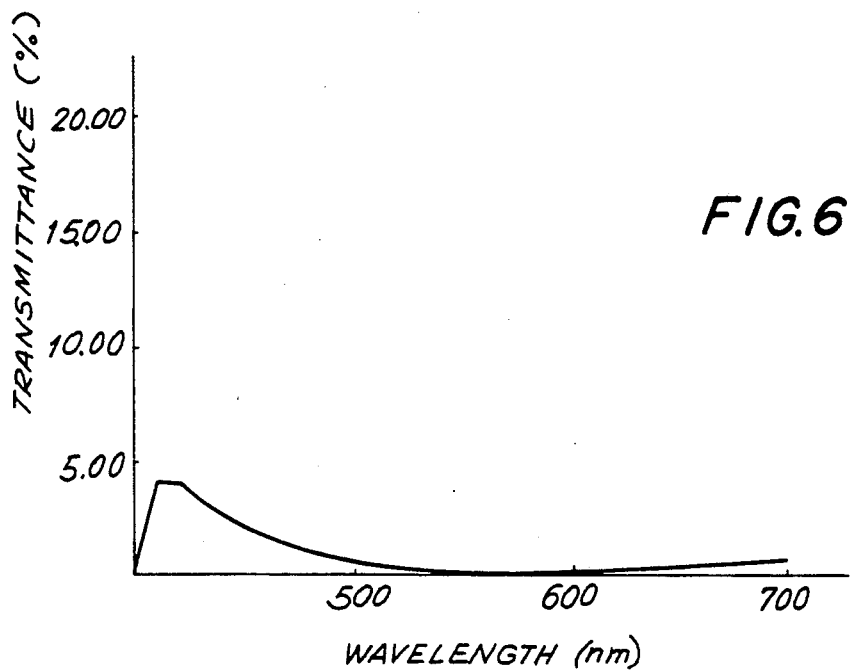
FIGS. 6 and 7 are plots of transmittance versus wavelength based on FIG. 4.
Figure 7:
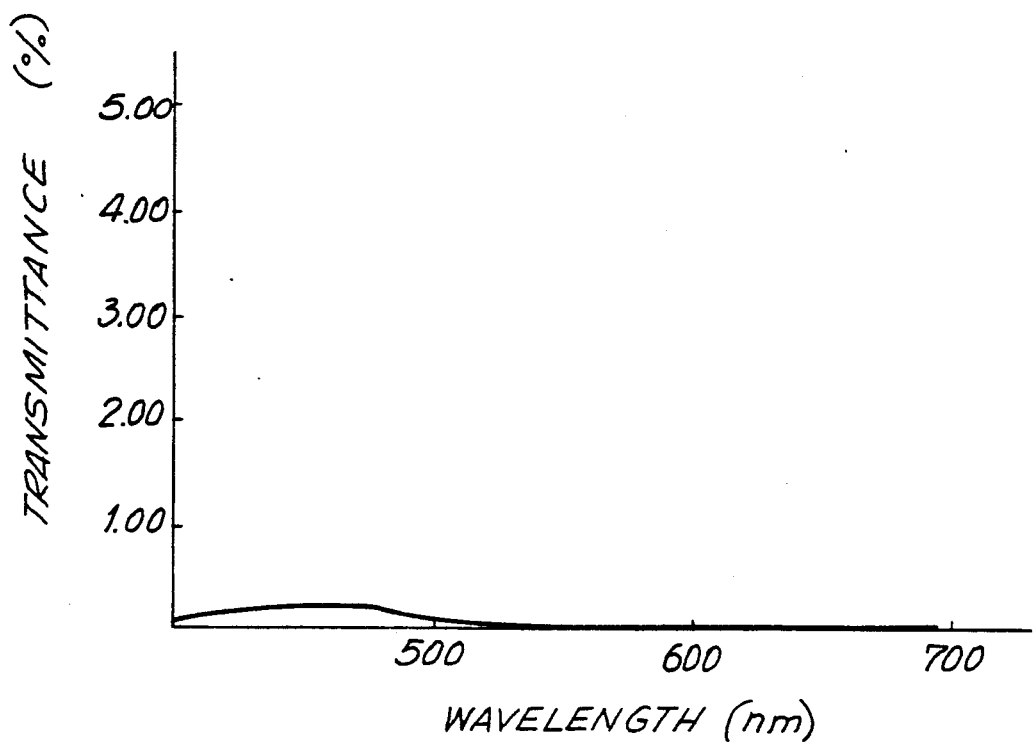

FIGS. 6 and 7 illustrate the spectra of transmittances produced by electro-optical device 100 under conditions (i) and (ii), respectively. As the variation in the transmittance levels decreases, the transmittance characteristics become relatively flat and decrease to a substantially colorless level. A substantially black display results. The minimum value of luminous transmittance $T_{min}$ occurs under condition (ii), that is, $T_{min} = 0.03\%$ and is illustrated versus wavelength in FIG. 7. The twist angle, refractive index dispersion $\alpha$ and optical length $\Delta n(590d$ of compensating cell A and display cell B under which the optimal transmittance characteristics of electro-optical device 100 are produced are listed in Table 1.

TABLE 1

| | twist | angle | $\alpha$ | $\Delta n(590)d$ ($\mu$m) | $T_{min}$ (%) |
|---|---|---|---|---|---|
| cell A | 240°, | right | 1.10 | 0.9 | 0.03 |
| cell B | 240°, | left | 1.10 | 0.9 | |

EXAMPLE 2

Figure 8:
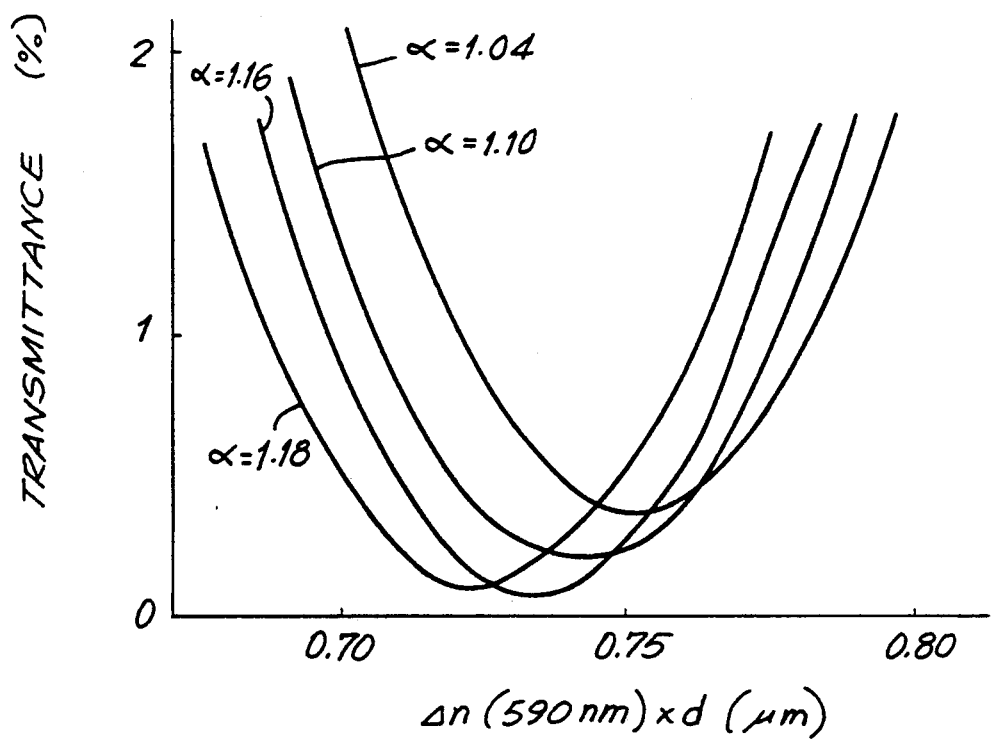
FIG. 8 is a plot of transmittance versus optical length of the compensating cell in accordance with an alternative embodiment of the invention.
Figure 10:
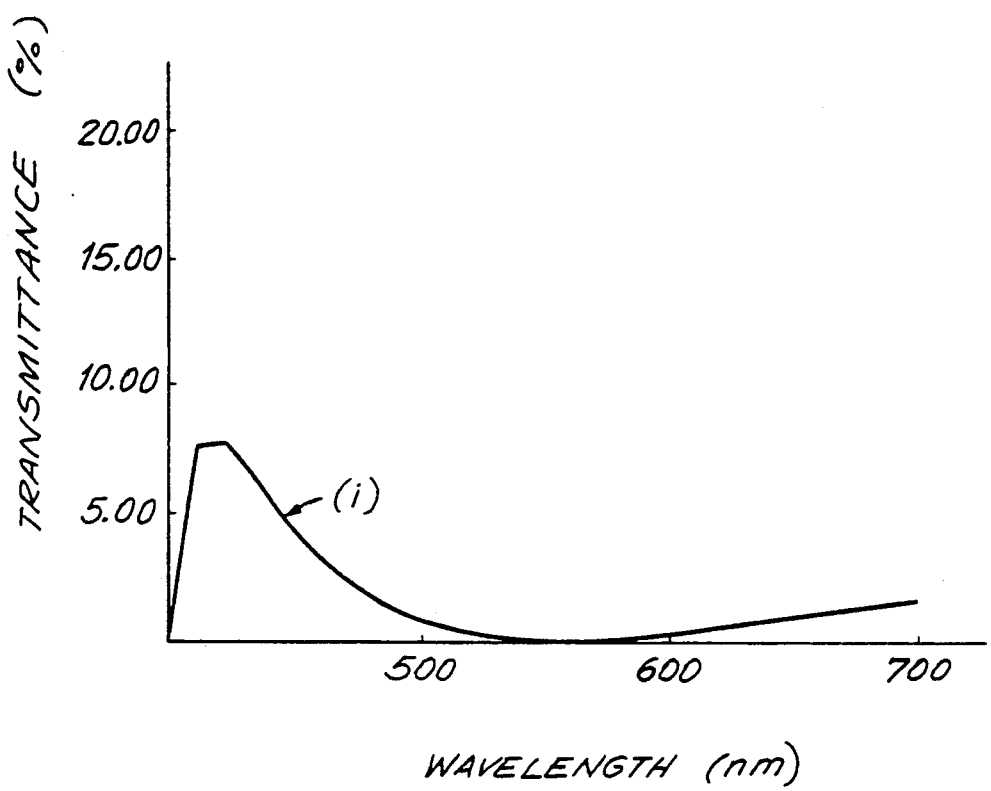
FIGS. 10 and 11 are plots of transmittance versus wavelength based on FIG. 8.
Figure 11:
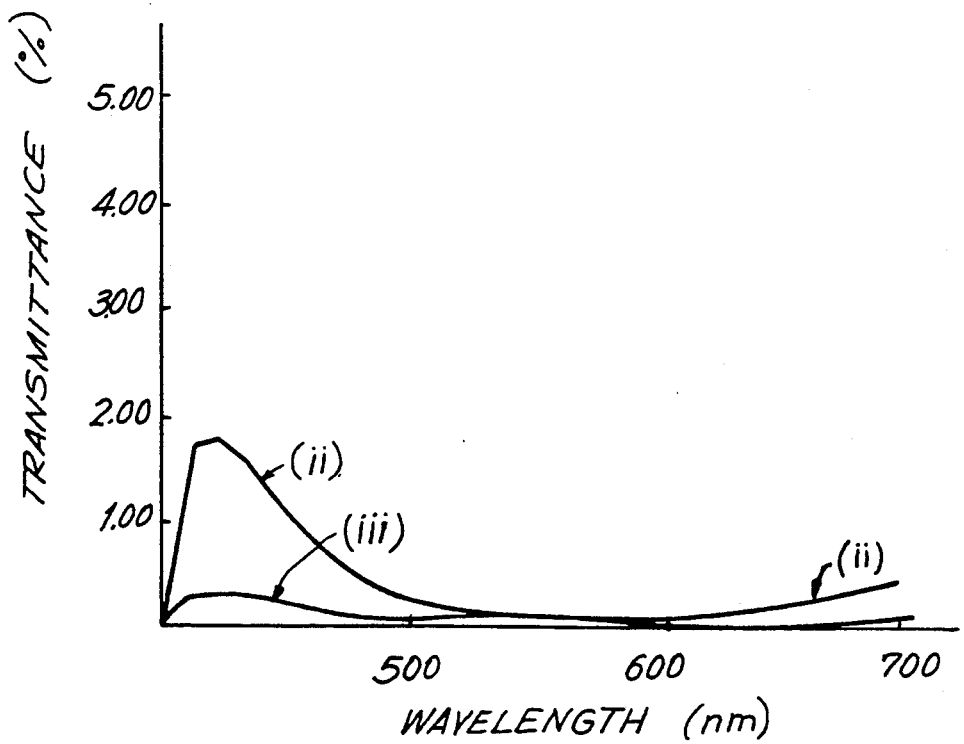

Display cell B is fabricated as described in Example 1. Compensating cell A included a liquid crystal composition having a twist to the right and a twist angle of 160°. As shown in FIG. 8, the luminous transmittance T of compensating cell A is plotted against the optical length $\Delta n(590)d$ for values of refractive index dispersion $\alpha$ equal to 1.04, 1.10, 1.16 and 1.18. The conditions (i.e. (iv), (v), (vi) and (vii)) under which each of the curves of FIG. 8 exhibits a minimum value of luminous transmittance $T_{min}$ are as follows:

| Condition | $\alpha$ | $\Delta n(590)d$ ($\mu$m) | Tmin (%) |
|---|---|---|---|
| (iv) | 1.04 | 0.75 | 0.39 |
| (v) | 1.10 | 0.74 | 0.12 |
| (vi) | 1.16 | 0.73 | 0.06 |
| (vii) | 1.18 | 0.72 | 0.08 |

Figure 9:
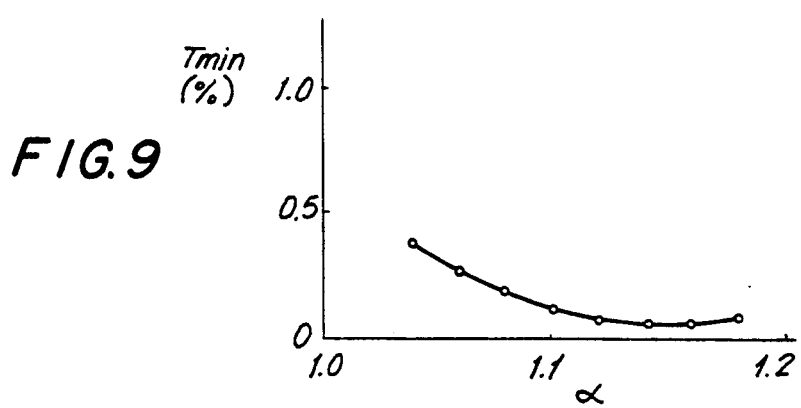
FIG. 9 is a plot of minimum transmittance versus refractive index dispersion α based on FIG. 8.

FIG. 9 shows the value so luminous transmittance $T_{min}$ plotted against refractive index dispersion $\alpha$ for conditions (iv), (v), (vi) and (vii). Condition (vi) exhibits the lowest minimum value of luminous transmittance $T_{min}$, that is, the least level of transmittance through compensating cell A. The twist angle, refractive index dispersion α and optical length Δ n(590)d for compensating cell A and display cell B under condition (vi) is listed in Table 2.

TABLE 2

|  | twist | angle | α | Δn(590)d (μm) | $T_{min}$ (%) |
|---|---|---|---|---|---|
| cell A | 160°, | right | 1.16 | 0.73 | 0.06 |
| cell B | | same as in Example 1 | | | |

EXAMPLE 3

Figure 12:
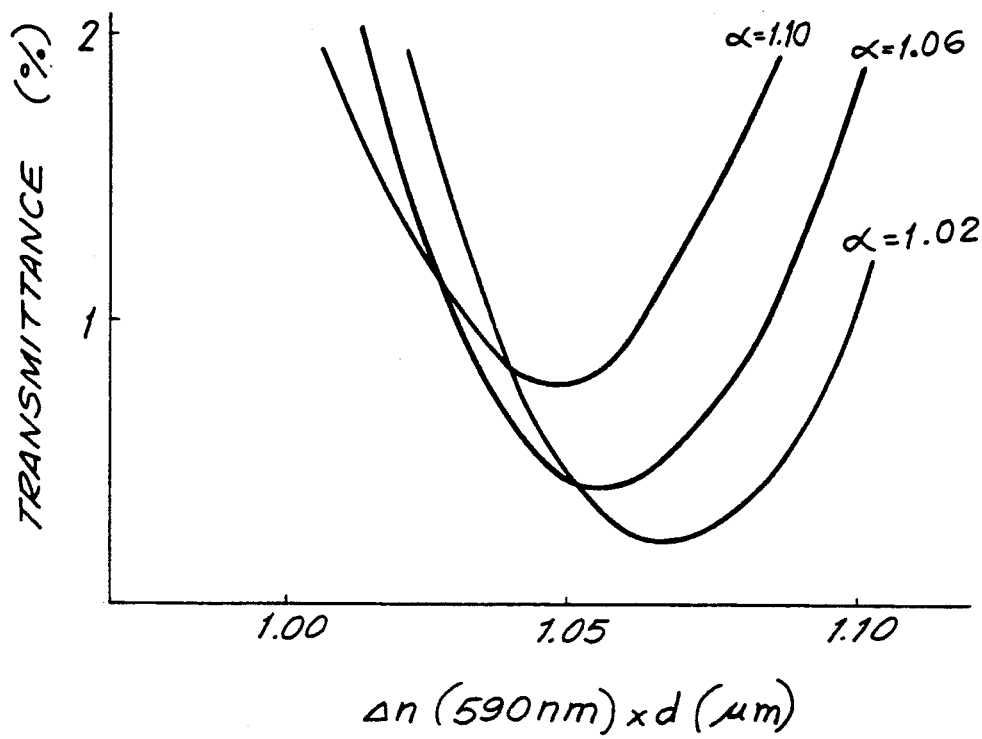
FIG. 12 is a plot of transmittance versus optical length of the compensating cell in accordance with another alternative embodiment of the invention.

Electro-optical device 100 was fabricated as described in Example 2 except that higher values of optical length Δ n(590)d of compensating cell A were used. FIG. 12 shows a plot of luminous transmittance T of compensating cell A versus optical length Δ n(590)d for values of refractive index dispersion α equal to 1.02, 1.08 and 1.12. The conditions (i.e. (viii), (ix) and (x)) under which the minimum values of luminous transmittance $T_{min}$ occur in FIG. 12 are as follows:

| Condition | α | Δn(590)d (μm) | Tmin (%) |
|---|---|---|---|
| (viii) | 1.02 | 1.07 | 0.20 |
| (ix) | 1.08 | 1.06 | 0.56 |
| (x) | 1.12 | 1.05 | 1.02 |

Figure 13:
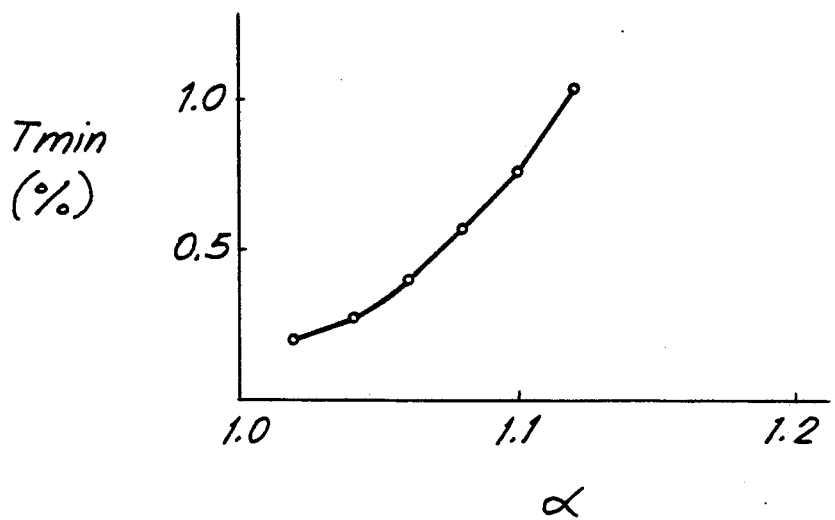
FIG. 13 is a plot of minimal transmittance versus refractive index dispersion α based on FIG. 12.

FIG. 13 illustrates the minimum values of luminous transmittance $T_{min}$ shown in FIG. 12 plotted against refractive index dispersion α. The twist angle, refractive index dispersion α and optical length Δ n(590)d for compensating cell A and display cell B based on the lowest minimum level of luminous transmittance $T_{min}$ equal to 0.20% are shown in Table 3.

TABLE 3

|  | twist | angle | α | Δn(590)d (μm) | $T_{min}$ (%) |
|---|---|---|---|---|---|
| cell A | same as in Example 2 | | 1.02 | 1.07 | 0.20 |
| cell B | | same as in Example 1 | | | |

EXAMPLE 4

Electro-optical device 100 was manufactured in substantially the same manner as described with respect to Examples 1, 2 and 3. Each compensating cell A included a liquid crystal composition with a twist to the right and a twist angle of 300°. The conditions (i.e. (xi), (xii) and (xiii)) under which the minimum luminous transmittances $T_{min}$ were measured and the values of transmittance $T_{min}$ are as follows:

| Condition | α | Δn(590)d (μm) | Tmin (%) |
|---|---|---|---|
| (xi) | 1.08 | 0.73 | 1.04 |
| (xii) | 1.12 | 0.72 | 0.78 |
| (xiii) | 1.18 | 0.71 | 0.52 |

Figure 14:
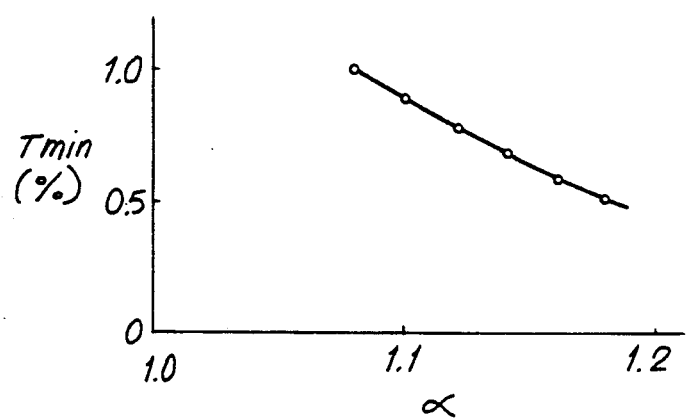
FIGS. 14, 15 and 16 are plots of minimum transmittance versus refractive index dispersion of the compensating cell in accordance with further alternative embodiments of the invention.

FIG. 14 illustrates the minimum value of luminous transmittance $T_{min}$ plotted against refractive index dispersion α based, in part, on conditions (xi), (xii) and (xiii). The twist angles, refractive index dispersions α and optical lengths Δ n(590)d of compensating cell A and display cell B based on the lowest minimum luminous transmittance $T_{min}$ value of 0.52% are listed in Table 4.

TABLE 4

|  | twist | angle | α | Δn(590)d (μm) | $T_{min}$ (%) |
|---|---|---|---|---|---|
| cell A | 300°, | right | 1.18 | 0.71 | 0.52 |
| cell B | | same as in Example 1 | | | |

EXAMPLE 5

Electro-optical device 100 was fabricated in substantially the same manner as set forth in Example 4 except that the optical lengths Δ n(590)d were increased. The conditions (i.e. (xiv), (xv) and (xvi)) under which the minimum values of luminous transmittance $T_{min}$ were taken and the values of $T_{min}$ measured are as follows:

| Condition | α | Δn(590)d (μm) | Tmin (%) |
|---|---|---|---|
| (xiv) | 1.02 | 1.12 | 0.05 |
| (xv) | 1.04 | 1.11 | 0.04 |
| (xvi) | 1.10 | 1.10 | 0.24 |

Figure 15:
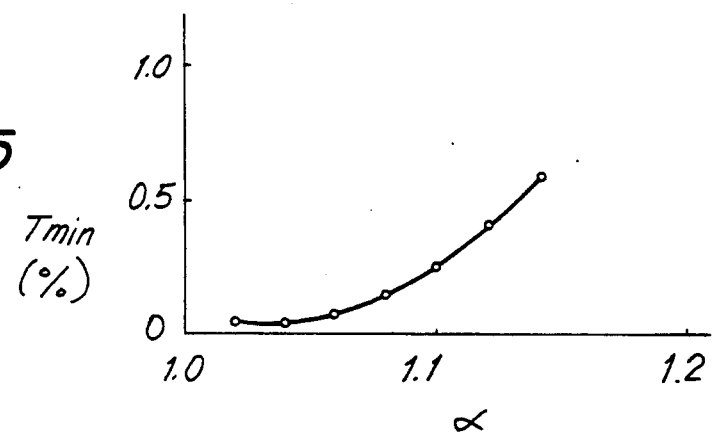

FIG. 15 illustrates the minimum values of luminous transmittance $T_{min}$ plotted against refractive index dispersion α based, in part, on conditions (xiv), (xv) and (xvi). The values of twist angle, refractive index dispersion α and optical length Δ n(590)d for compensating cell A and display cell B based on luminous transmittance $T_{min}=0.04\%$ are listed in Table 5.

TABLE 5

|  | twist | angle | α | Δn(590)d (μm) | $T_{min}$ (%) |
|---|---|---|---|---|---|
| cell A | same as in Example 4 | | 1.04 | 1.11 | 0.04 |
| cell B | | same as in Example 1 | | | |

EXAMPLE 6

Display cell B included a liquid crystal composition with a twist to the left and a twist angle of 270°, refractive index dispersion α=1.20 and optical length Δn(590)d=0.8 μm. The liquid crystal composition of compensating cell A was twisted to the right with a twist angle of 140°. The conditions (i.e. (xvii), (xviii) and (xix)) under which the minimum values of luminous transmittance $T_{min}$ were measured and the values of $T_{min}$ are as follows:

| Condition | α | Δn(590)d (μm) | Tmin (%) |
|---|---|---|---|
| (xvii) | 1.08 | 0.78 | 0.36 |
| (xviii) | 1.14 | 0.77 | 0.30 |
| (xix) | 1.18 | 0.76 | 0.38 |

Figure 16:
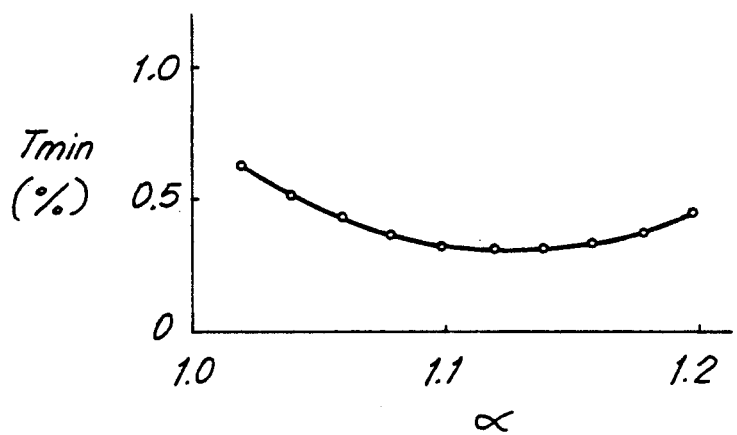

FIG. 16 illustrates a plot of the minimum value of luminous transmittance $T_{min}$ plotted against refractive index dispersion α based, in part, on conditions (xvii), (xviii) and (xix). The twist angle, refractive index dispersion α and optical length Δ n(590)d of compensating cell A and display cell B based on $T_{min}=0.30\%$ are listed in Table 6.

TABLE 6

|  | twist | angle | α | Δn(590)d (μm) | $T_{min}$ (%) |
|---|---|---|---|---|---|
| cell A | 140°, | right | 1.14 | 0.77 | 0.30 |
| cell B | 270°, | left | 1.20 | 0.80 | |

EXAMPLE 7

Figure 17:
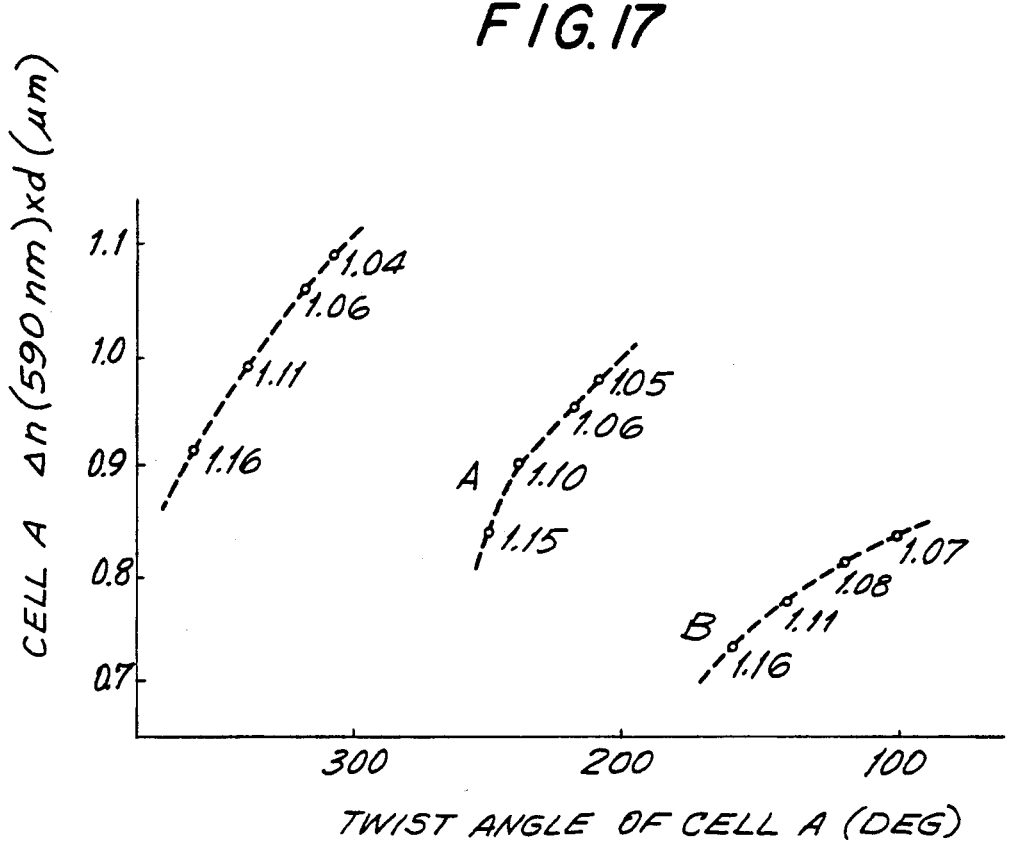
FIGS. 17 and 18 are plots of optical length versus twist angle of the compensating cell in accordance with still further alternative embodiments of the invention.

The twist angle of compensating cell A used in Examples 1-5 relative to display cell B was varied. FIG. 17 illustrates a plot of optical length $\Delta$ n(590)d versus the twist angle of compensating cell A based on a plurality of values of refractive index dispersion $\alpha$. The values of optical length $\Delta$ n(590)d shown in FIG. 17 represent the smallest values of transmittance $T_{min}$ measured in Example 1-5. Points A and B were obtained based on Examples 1 and 2, respectively.

EXAMPLE 8

Figure 18:
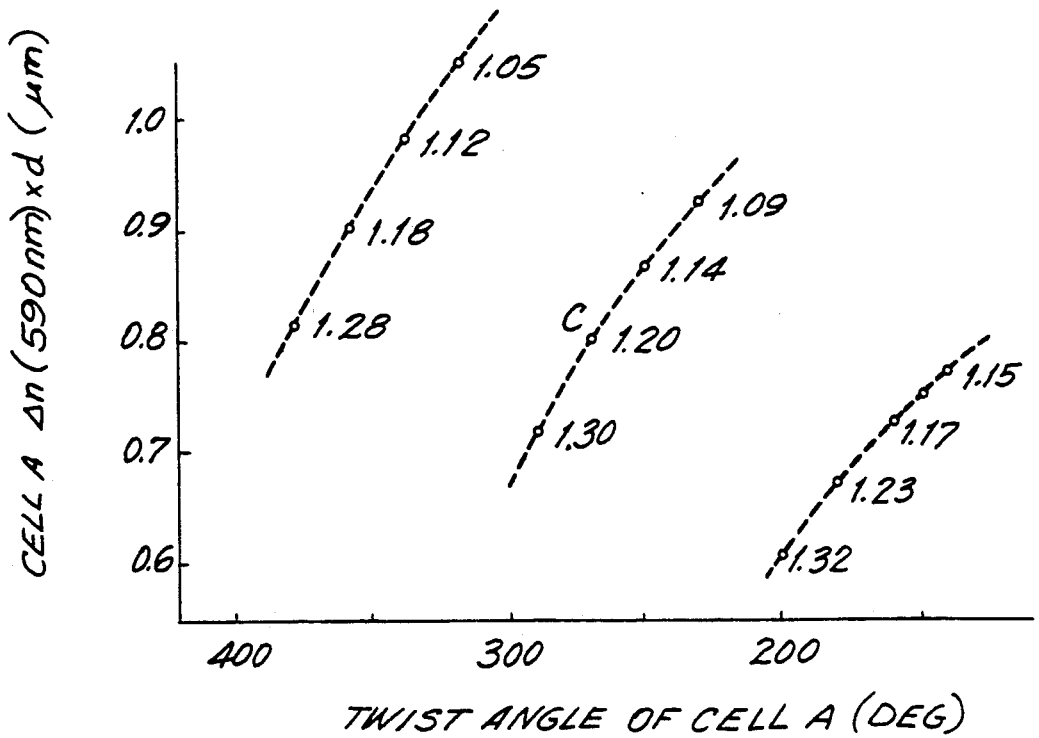

The twist angle of compensating cell A relative to display cell B described in Example 6 was changed. FIG. 18 illustrates optical length $\Delta$ n(590)d plotted against the twist angle of compensating cell A for various values of refractive index dispersion $\alpha$.

FIGS. 17 and 18 reveal that when compensating cell A is identical to display cell B with respect to the absolute value of twist angle, refractive index dispersion $\alpha$ and optical length $\Delta$ n(590)d and varies only with respect to direction of twist rotation, the minimum value of transmittance for electro-optical device 100 is represented by Point A in FIG. 17 and Point C in FIG. 18. Furthermore, the twist angles of compensating cell A and display cell B need not be equal to obtain a suitable and extremely low level of transmittance provided that suitable values of refractive index dispersion $\alpha$ and optical length $\Delta$ n(590)d are selected. A monochromatic black and white display also can be provided outside of the points plotted in FIGS. 17 and 18. In practice, acceptable ranges of conditions around points A and B exist. The range of acceptable values of twist angle, refractive index dispersion $\alpha$ and twist optical length $\Delta$ n(590)d can be enlarged or narrowed depending on the strictness in the standards imposed with respect to the levels of transmittance (i.e., degree of blackness and whiteness required).

EXAMPLE 9

Figure 19:
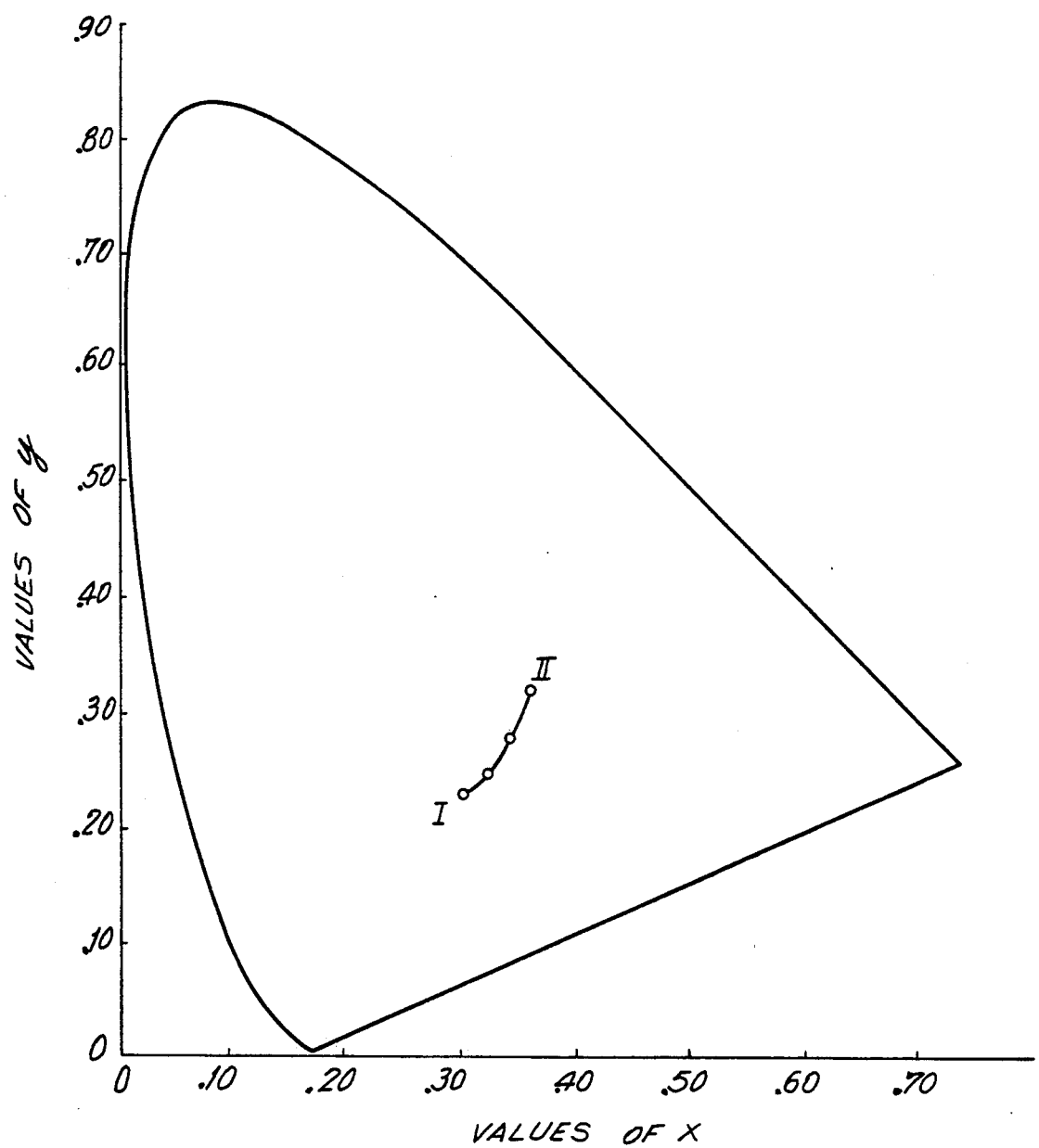
FIGS. 19-22 are CIE chromaticity diagrams in accordance with additional alternative embodiments of the invention.

Layer thickness d of display cell B was set to about 6.3 $\mu$m with an anisotropy $\Delta$ n(590) of liquid crystal material 6 equal to 0.13. The twist angle of display cell B was 200°. Compensating cell A had an anisotropy $\Delta$ n(590) of liquid crystal material 5 equal to 0.11. The twist angle of liquid crystal material 5 in compensating cell 2 was 200°. Liquid crystal material 5 of compensating cell A had a twist angle opposite to liquid crystal material 6 of display cell B. Layer thickness d of compensating cell A was approximately 7.4 $\mu$m. The color non-uniformity measured is shown in the CIE chromaticity diagram of FIG. 19. The thickest and thinnest layer portions of compensating cell A are represented in FIG. 19 by points I and II, respectively. Two additional portions of intermediate layer thickness were measured and are shown in FIG. 19.

Figure 20:
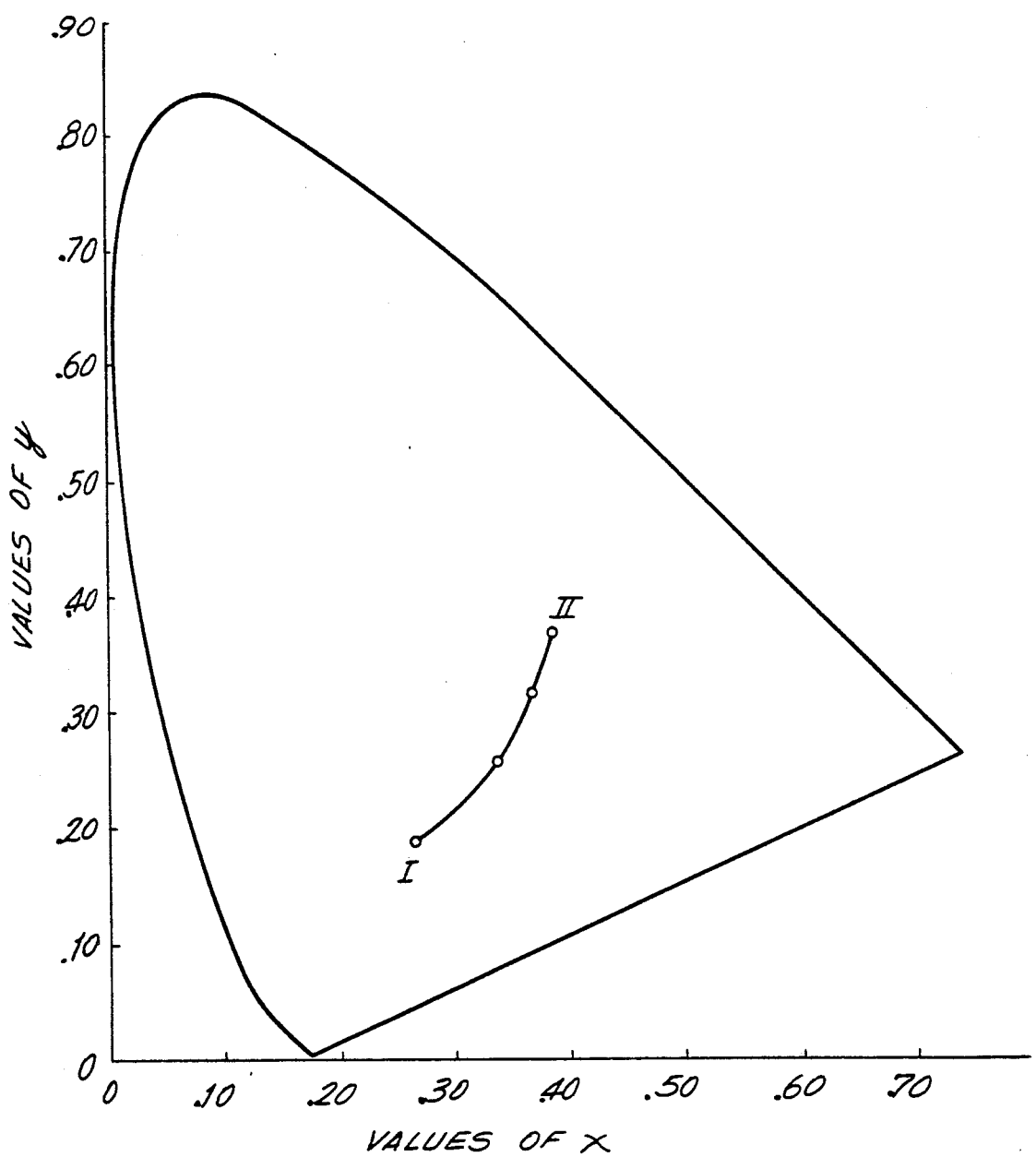

As a comparative example, anisotropy $\Delta$ n(590) of liquid crystal material 5 of compensating cell A was changed to a value of 0.13 and layer thickness d was changed to approximately 6.3 $\mu$m. In other words, compensating cell A had the same values of anisotropy $\Delta$ n(590) and layer thickness d as display cell B. The color non-uniformity measured is shown in the CIE chromaticity diagram of FIG. 20. The thickest and thinnest layer portions of compensating cell A are represented by points I and II, respectively. Comparing FIGS. 19 to 20, it is clear that by increasing layer thickness d of compensating cell A relative to layer thickness d of display cell B, color non-uniformity is reduced.

EXAMPLE 10

Electro-optical device 100 was fabricated in substantially the same manner as disclosed with respect to Example 9 except that anisotropy $\Delta$ n(590) and layer thickness d of liquid crystal material 5 of compensating cell A were changed to values of 0.086 and 10.0 $\mu$m, respectively. Color non-uniformity was reduced as compared to Example 9. For all practical purposes, color non-uniformity did not exist.

EXAMPLE 11

The twist angle of liquid crystal material 6 of display cell B of Example 9 was changed to 260°. Electro-optical device 100 displayed a bluish color. However, color non-uniformity was low.

EXAMPLE 12

Figure 21:
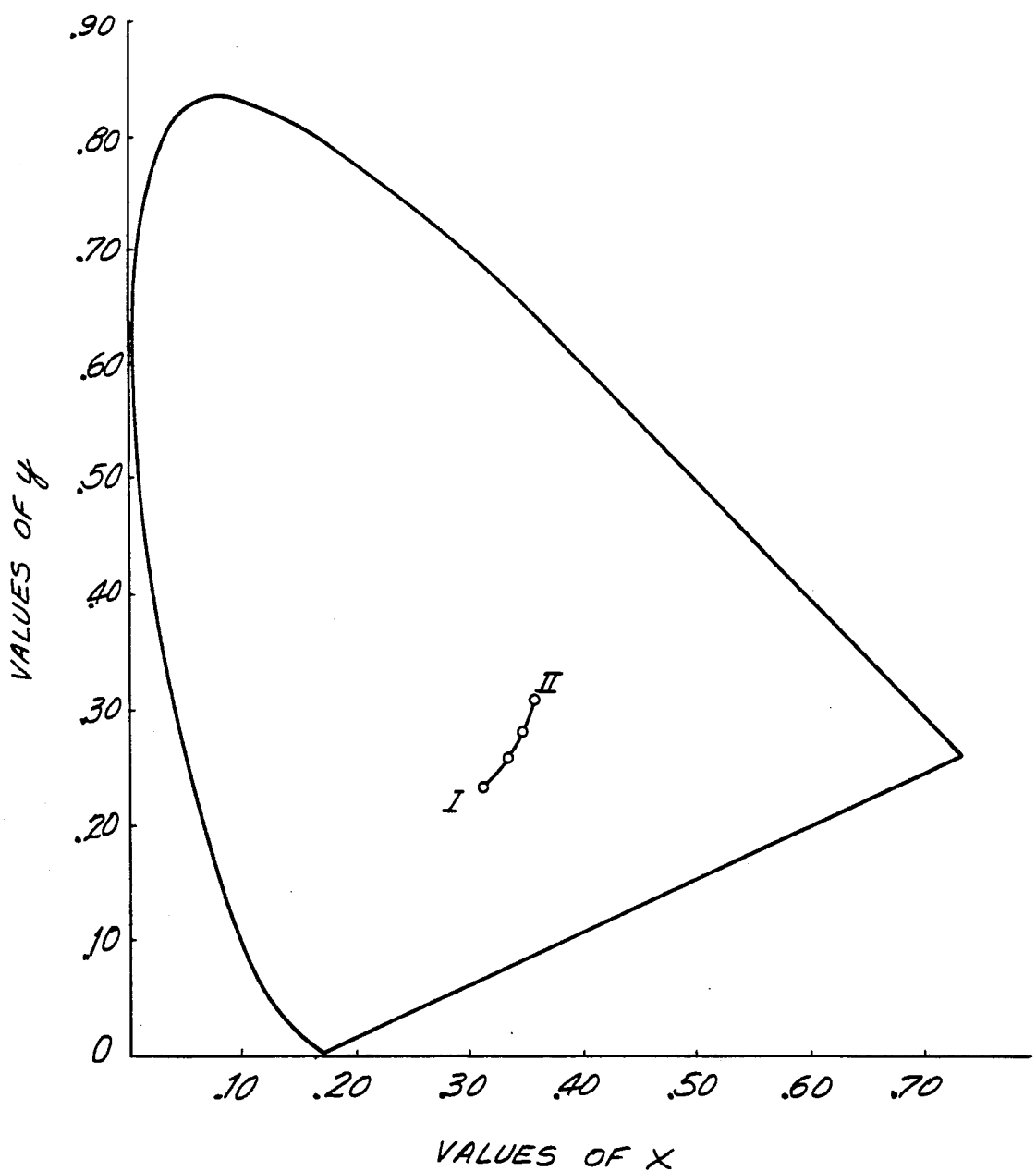

Compensating cell A and display cell B were fabricated in accordance with Table 1 of Example 1. Anisotropy $\Delta$ n(590) of liquid crystal material 6 of display cell B was set to a value of 0.15. Layer thickness d of liquid crystal material 6 of cell B was set to 6.0 $\mu$m, respectively. Anisotropy n(590) and layer thickness d of liquid crystal material 5 of compensating cell B were set at values of 0.10 and 9.0 $\mu$m, respectively. Generally, layer thickness d of compensating cell A and display B were not uniform resulting in color non-uniformity. The color non-uniformity due to the non-uniform layer thickness d of compensating cell A is illustrated in FIG. 21. The thickest and thinnest portions of layer thickness d of compensating cell A are represented by points I and II, respectively. Two additional portions of intermediate layer thickness d are also shown in FIG. 21.

As a comparative example, anisotropy $\Delta$ n(590) and layer thickness d of liquid crystal material 5 of both compensating cell A and display cell B were set to values of 0.15 and 6.0 $\mu$m, respectively. Liquid crystal material 5 was twisted to the right at a twist angle of 240°. Color non-uniformity was measured due to the non-uniform layer thickness d of compensating cell A in the same manner as in the Examples discussed above and are shown in the CIE chromaticity diagram of FIG. 22. The greatest and smallest values of layer thickness d of compensating cell A are denoted by points I and II, respectively.

Figure 22:
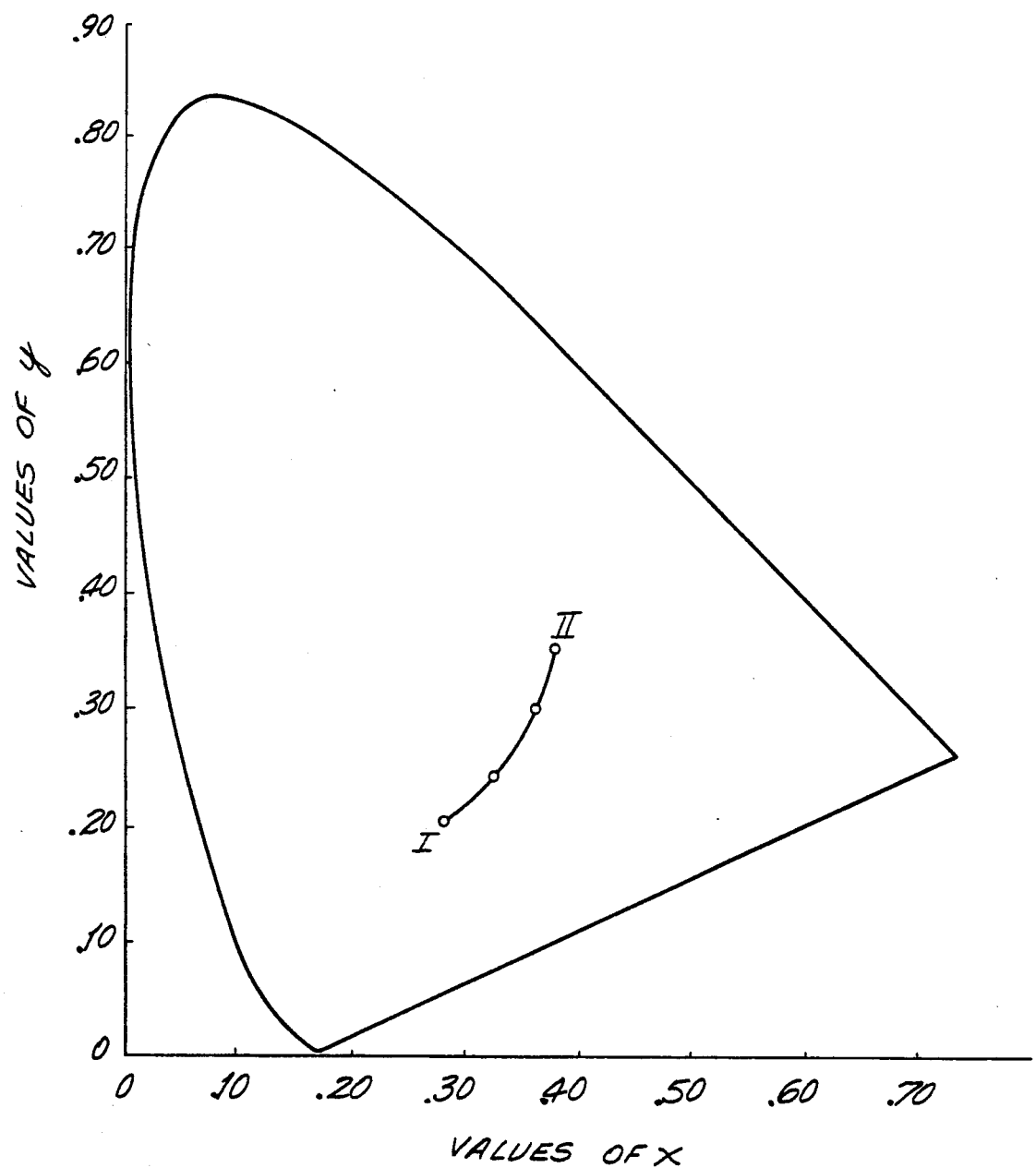

Comparison of FIGS. 21 and 22, shows that color non-uniformity is reduced by increasing layer thickness d of compensating cell A relative to layer thickness d of display cell B when optical length $\Delta$ n(590)d of compensating cell A and display cell B are the same.

EXAMPLE 13

Electro-optical device 100 was fabricated in substantially the same manner as disclosed in Example 12 except that anisotropy $\Delta$ n(590) and layer thickness d of compensating cell A were changed to values of 0.075 and 12.0 $\mu$m, respectively. Optical length $\Delta n(590)d = 0.9$ $\mu$m. Color non-uniformity was lower than exhibited than in Example 12.

EXAMPLE 14

Referring again to FIG. 1, a transparent electrode was formed on upper plate 7 of compensating cell A and a similar transparent electrode was formed on lower plate 8 whereby the two transparent electrodes faced each other. Display cell B of Example 12 was employed. Liquid crystal material 5 of compensating cell A was twisted to the right through an angle of 240°. Refractive index dispersion $\alpha$ and anisotropy $\Delta$ n(590) were set to values of 1.10 and 0.13, respectively. Layer thickness d of compensating cell A was 10 $\mu$m. The permittivity anisotropy $\Delta \epsilon$ of liquid crystal material 5 of compensating cell A was positive. The level of brightness was adjusted by applying a suitable voltage across the transparent electrodes of compensating cell A.

EXAMPLE 15

The liquid crystal of display cell B was twisted to the left through an angle of 240°. Refractive index dispersion $\alpha$ and optical length $\Delta$ n(590)d of both display cell B and compensating cell A were set at values of 1.10 and 0.9 $\mu$m, respectively. The liquid crystal of compensating cell A was twisted to the right through an angle of 240°. An initial transmittance $T_o$ (i.e. when a voltage of 0 volts is applied across the transparent electrodes of compensating cell A) was minimal.

When optical length $\Delta$ n(590)d of compensating cell A was set to a value of 0.87 $\mu$m, a higher level of initial transmittance $T_o$ was obtained compared to optical length $\Delta$ n(590)d set to a value of 0.9 $\mu$m. The transmittance-voltage characteristics with optical length $\Delta$ n(590)d of compensating cell A set at values of 0.87 $\mu$m and 0.90 $\mu$m based on electro-optical device 100 driven by a well known multiplexing technique are shown in FIGS. 23 and 24, respectively.

Figure 23:
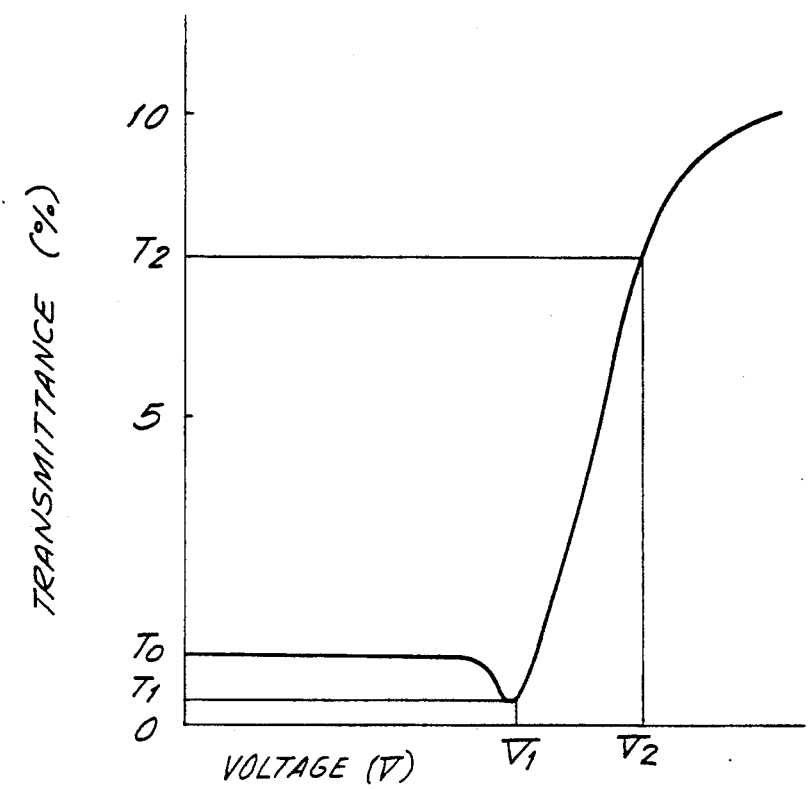
FIGS. 23 and 24 illustrate transmittance-voltage characteristics in accordance with further additional alternative embodiments of the invention.
Figure 24:
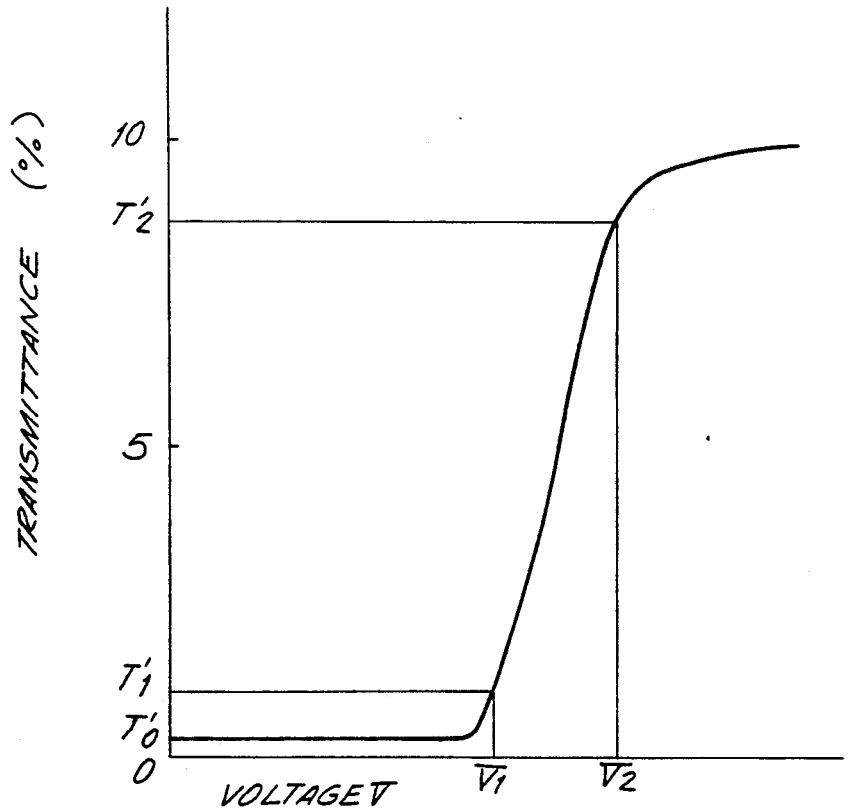

In FIG. 23, an initial transmittance $T_0$ and transmittances $T_1$ and $T_2$ correspond to applied voltages across the transparent electrodes of compensating cell A equal to values of 0, V V$_2$, respectively. In FIG. 24, an initial transmittance $T_0'$, and transmittances $T_1'$, and $T_2'$, correspond to applied voltages across the transparent electrodes of compensating cell A equal to values of 0, $V_1$ and $V_2$, respectively. The ratio of $V_1/V_2$ in FIGS. 23 and 24 is constant. Contrast is defined by $T_2/T_1$ in FIG. 23 and by $T_2'/T_1'$ in FIG. 24. In comparing FIG. 23 to FIG. 24, it is clear that by decreasing optical length $\Delta$ n(590)d of compensating cell A provides a minimum level of initial transmittance $T_0$ and a higher contrast.

EXAMPLE 16

Display cell B included a liquid crystal composition having a twist angle of 240° to the left. Refractive index dispersion $\alpha$ and optical length $\Delta$ n(590)d were set at values of 1.14 and 0.9 $\mu$m, respectively. The liquid crystal of compensating cell A was twisted to the right and had a twist angle of 150°. Refractive index dispersion $\alpha$ and optical length $\Delta$ n(590)d were set at values of 1.10 and 0.76 $\mu$m, respectively. Initial transmittance $T_0$ was minimal. By setting optical length $\Delta$ n(590)d of compensating cell A to a value of 0.74 $\mu$m, the contrast improved during multiplex driving. When optical length $\Delta$ n(590)d of compensating cell A was reduced to a value of 0.74 $\mu$m, similar results were also obtained by reducing either anisotropy $\Delta$ n(590) or layer thickness d of compensating cell A. Additionally, the contrast was improved by reducing both anisotropy $\Delta$ n(590) and layer thickness d of compensating cell A.

EXAMPLE 17

Figure 25:
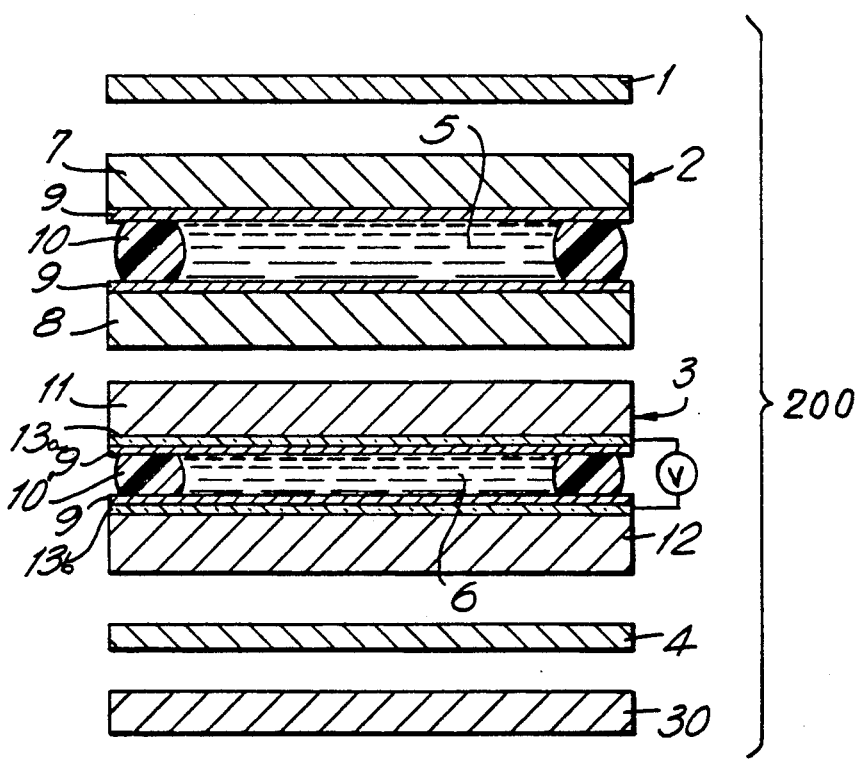
FIG. 25 is a partially exploded cross-sectional view of a reflective type electro-optical device in accordance with a yet another alternative embodiment of the invention.

FIG. 25 illustrates a cross sectional view of a reflective-type electro-optical device 200 in accordance with an alternative embodiment of the invention. Elements shown in FIG. 25 which are identical to elements shown in FIG. 1 are identified by like reference numerals.

Device 200 includes a reflecting plate 30 which is disposed adjacent to polarizer 4. Depending on whether device 200 is a positive or a negative type display and whether a voltage is applied to at least portions of transparent electrodes of display cell 3, light entering device 200 through polarizer 1 can travel through compensating cell 2, display cell 3 and polarizer 4 and be reflected by reflecting plate 30 through polarizer 4, display cell 3 and compensating cell 2 exiting device 200 through polarizer 1. Reflecting plate 30 can be constructed to provide a polarizing function whereby light is both polarized and reflected by reflecting plate 30. Under such circumstances, lower polarizer 4 can be eliminated from device 200 resulting in a simpler and less costly electro-optical device.

As now can be readily appreciated, an electro-optical device using a STN liquid crystal display cell and a compensating cell prepared in accordance with the invention in which the twist angles, refractive index of dispersion $\alpha$, layer thickness d and anisotropy $\Delta$ n can vary between cells while providing a suitable display with high contrast. The compensating cell can be made from a variety of different liquid crystalline materials.

In one preferred embodiment of the invention, device 100 produces an extremely low level of transmittance, exhibiting a blackish color when no voltage is applied across the display cell and a high level of transmittance, exhibiting a whitish color when voltage is applied to the display cell. Consequently, the electro-optical device can provide a monochromatic black and white display with high contrast.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

We claim:

1. An electro-optical device, comprising:
   liquid crystal cell means including a twisted nematic liquid crystal material for producing a display characterized by a plurality of parameters including refractive index dispersion $\alpha$, refractive index anisotropy $\Delta$ n and layer thickness d; and
   compensating means adjacent to the liquid crystal cell means for compensating for the color of said display with at least one of its parameters including refractive index dispersion $\alpha$, refractive index anisotropy $\Delta$ n and layer thickness d differing in value from the corresponding parameter of the liquid crystal cell means;
   wherein the refractive index dispersion $\alpha$ equals the ratio of refractive index anisotropy $\Delta$ n at a first spectral wavelength to the refractive index anisotropy $\Delta$ n at a second spectral wavelength.

2. The electro-optical device of claim 1, wherein the compensating means includes at least one layer of an optically anisotropic material.

3. The electro-optical device of claim 2, wherein the compensating means has a twist angle of between about 0° to 400°.

4. The electro-optical device of claim 3, wherein the compensating means is a nematic liquid crystal cell.

5. The electro-optical device of claim 1, wherein the compensating means is a twisted nematic liquid crystal cell.

6. The electro-optical device of claim 1, wherein the liquid crystal material in the compensating means is a super-twisted liquid crystal material.

7. The electro-optical device of claim 1, further including a pair of linear polarizers with one polarizer disposed adjacent to the liquid crystal cell means and the second of said polarizers disposed adjacent to the compensating means whereby incident linearly polarized light passing through the first polarizer is double refracted by the liquid crystal cell means and enters the compensating means as elliptically polarized light which is converted back to linearly polarized light by the compensating means.

8. The electro-optical device of claim 1, further including reflecting means for reflecting light transmitted through the display and disposed adjacent to one of said pair of linear polarizers.

9. The electro-optical device of claim 1, wherein the liquid crystal material in the liquid crystal cell means has a twist angle between about 90° and 360°.

10. The electro-optical device of claim 1, wherein the compensating means has a twist angle of between about 0° to 400°.

11. The electro-optical device of claim 1, wherein the product of the refractive index anisotropy $\Delta n$ and layer thickness d of the compensating means is less than the product of the refractive index anisotropy $\Delta n$ and layer thickness d of the liquid crystal means.

12. The electro-optical device of claim 1, further including reflector means for reflecting light transmitted through the liquid crystal cell means and compensating means.

13. The electro-optical device of claim 1, further including a linear polarizer having a polarizing axis and disposed adjacent to one of said liquid crystal cell means and compensating means and a reflecting means for reflecting light transmitted through the liquid crystal cell means and having a polarizing axis for polarizing said display and disposed adjacent to the other of said liquid crystal cell means and compensating means whereby said electro-optical device is operable for permitting incident light linearly polarized by the polarizer to pass through the liquid crystal cell means and compensating means and be reflected and polarized by the reflecting means resulting in a linearly polarized display being emitted from the polarizer.

14. The electro-optical device of claim 1, wherein the first and second spectral wavelengths are 450 nanometers and 590 nanometers, respectively.

15. An electro-optical device, comprising:
a voltage source for selectively generating a voltage;
liquid crystal cell means including a twisted nematic liquid crystal material for producing a display in response to application of voltage across the liquid crystal material, characterized by a plurality of parameters including refractive index dispersion $\alpha$, refractive index anisotropy $\Delta n$, layer thickness d and twist angle; and
compensating means adjacent to the liquid crystal cell means for compensating for the color of said display with at least one of its parameters including refractive index dispersion $\alpha$, refractive index anisotropy $\Delta n$, layer thickness d and twist angle differing in value from the corresponding parameter of the liquid crystal cell means;
wherein the refractive index dispersion $\alpha$ represents the degree of dispersion of refractive index anisotropy $\Delta n$ based on the spectral wavelength of associated incident light and wherein the layer thickness d of the compensating means is greater than the layer thickness d of the liquid crystal cell means.

16. The electro-optical device of claim 15, wherein a nematic liquid crystal material serves as the compensating means.

17. An electro-optical device, comprising:
a voltage source for selectively generating a voltage;
liquid crystal cell means including a twisted nematic liquid crystal material for producing a display in response to application of voltage across the liquid crystal material, characterized by a plurality of parameters including refractive index dispersion $\alpha$, refractive index anisotropy $\Delta n$, layer thickness d and twist angle; and
compensating means having at least one layer of an optically anisotropic material and adjacent to the liquid crystal cell means for compensating for the color of said display with at least one of its parameters including refractive index dispersion $\alpha$, refractive index anisotropy $\Delta n$, layer thickness d and twist angle differing in value from the corresponding parameter of the liquid crystal cell means;
wherein the refractive index dispersion $\alpha$ represents the degree of dispersion of refractive index anisotropy $\Delta n$ based on the spectral wavelength of associated incident light and wherein the layer thickness d of the compensating means is greater than the layer thickness d of the liquid crystal cell means.

18. The electro-optical device of claim 17, wherein the compensating means is a nematic liquid crystal cell.

19. An electro-optical device comprising:
voltage source means for selectively generating a voltage;
a liquid crystal display cell including a twisted nematic liquid crystal material for producing a display in response to application of said voltage across the liquid crystal material and characterized by a plurality of parameters including refractive index dispersion $\alpha$, refractive index anisotropy $\Delta n$, layer thickness d and a twist angle ranging between about 90° and 360°; and
at least one layer of an optically anisotropic material for compensating for the color of said display and characterized by a plurality of parameters including refractive index dispersion $\alpha$, refractive index anisotropy $\Delta n$, layer thickness d and a twist angle ranging between 0° to 400°;
wherein at least one of the parameters characterizing the twisted nematic liquid crystal cell differs in value from the corresponding parameter characterizing the at least one optically anisotropic material and wherein the refractive index dispersions $\alpha$ of the cell and of the material are each defined as the ratio of its anisotropy at 450 nanometers to its anisotropy at 590 nanometers.

20. The electro-optical device of claim 19, further including a pair of linear polarizers, each polarizer having a polarizing axis, the first of said pair of polarizers disposed adjacent to the twisted nematic liquid crystal cell and the second of said pair of polarizers disposed adjacent to the at least one optically anisotropic material whereby incident linearly polarized light passing through the first polarizer is double refracted by the twisted nematic liquid crystal cell and enters the at least one optically anisotropic material as elliptically polarized light which is converted back to linearly polarized light by the at least one optically anisotropic material.

21. An electro-optical device, comprising:
liquid crystal cell means including a twisted nematic liquid crystal material for producing a display characterized by a first group of parameters including refractive index dispersion $\alpha$, refractive index anisotropy $\Delta n$, layer thickness d, and twist angle; and
compensating means for compensating for the color of said display characterized by a second group of parameters including refractive index dispersion $\alpha$, refractive index anisotropy $\Delta n$, layer thickness d, and twist angle;
wherein the relationship between the first group of parameters and said second group of parameters is selected to optimize monochromatic operation such that incident linearly polarized light is double refracted by said liquid crystal cell means and enters said compensating means as elliptically polarized light which is converted back to linearly polarized light by the compensating means and wherein the refractive index dispersion $\alpha$ equals the ratio of refractive index anisotropy $\Delta n$ at a first spectral wavelength to the refractive index anisotropy $\Delta n$ at a second spectral wavelength.

22. The electro-optical device of claim 21, wherein the compensating means includes at least one layer of an optically anisotropic material.

23. The electro-optical device of claim 22, wherein the compensating means has a twist angle of between about 0° to 400°.

24. The electro-optical device of claim 23, wherein the compensating means is a nematic liquid crystal cell.

25. The electro-optical device of claim 21, wherein the compensating means is a twisted nematic liquid crystal cell.

26. The electro-optical device of claim 21, wherein the liquid crystal material in the compensating means is a super-twisted liquid crystal material.

27. The electro-optical device of claim 21, further including a pair of linear polarizers with one polarizer disposed adjacent to the liquid crystal cell means and the second of said polarizers disposed adjacent to the compensating means.

28. The electro-optical device of claim 27, further including reflecting means for reflecting light transmitted through the display and disposed adjacent to one of said pair of linear polarizers.

29. The electro-optical device of claim 21, wherein the liquid crystal material in the liquid crystal cell means has a twist angle between about 90° and 360°.

30. The electro-optical device of claim 21, wherein the compensating means has a twist angle of between about 0° to 400°.

31. The electro-optical device of claim 21, wherein the product of the refractive index anisotropy $\Delta n$ and layer thickness d of the compensating means is less than the product of the refractive index anisotropy $\Delta n$ and layer thickness d of the liquid crystal means.

32. The electro-optical device of claim 21, further including reflector means for reflecting light transmitted through the liquid crystal cell means and compensating means.

33. The electro-optical device of claim 21, further including a linear polarizer having a polarizing axis and disposed adjacent to one of said liquid crystal cell means and compensating means and a reflecting means for reflecting light transmitted through the liquid crystal cell means and having a polarizing axis for polarizing said display and disposed adjacent to the other of said liquid crystal cell means and compensating means whereby said electro-optical device is operable for permitting incident light linearly polarized by the polarizer to pass through the liquid crystal cell means and compensating means and be reflected and polarized by the reflecting means resulting in a linearly polarized display being emitted from the polarizer.

34. The electro-optical device of claim 21 wherein the first and second spectral wavelengths are 450 nanometers and 590 nanometers, respectively.

35. An electro-optical device, comprising:
liquid crystal cell means including a twisted nematic liquid crystal material for producing a display characterized by a first group of parameters including refractive index dispersion $\alpha$, refractive index anisotropy $\Delta n$, layer thickness d and twist angle; and
compensating means for compensating for the color of said display characterized by a second group of parameters including refractive index dispersion $\alpha$, refractive index anisotropy $\Delta n$, layer thickness d and twist angle;
wherein the relationship between the first group of parameters and said second group of parameters is selected to optimize monochromatic operation such that incident linearly polarized light is double refracted by said liquid crystal cell means and enters said compensating means as elliptically polarized light which is converted back to linearly polarized light by the compensating means and wherein the layer thickness d of the compensating means is greater than the layer thickness d of the liquid crystal cell means.

36. The electro-optical device of claim 35, wherein a nematic liquid crystal material serves as the compensating means.

37. An electro-optical device, comprising:
liquid crystal cell means including a twisted nematic liquid crystal material for producing a display characterized by a first group of parameters including refractive index dispersion $\alpha$, refractive index anisotropy $\Delta n$, layer thickness d and twist angle; and
compensating means having at least one layer of an optically anisotropic material and for compensating for the color of said display characterized by a second group of parameters including refractive index dispersion $\alpha$, refractive index anisotropy $\Delta n$, layer thickness d and twist angle;
wherein the relationship between the first group of parameters and said second group of parameters is selected to optimize monochromatic operation such that incident linearly polarized light is double refracted by said liquid crystal cell means and enters said compensating means as elliptically polarized light which is converted back to linearly polarized light by the compensating means and wherein the layer thickness d of the compensating means is greater than the layer thickness d of the liquid crystal cell means.

38. The electro-optical device of claim 37, wherein the compensating means is a nematic liquid crystal cell.

39. An electro-optical device, comprising:
  liquid crystal cell means including a twisted nematic liquid crystal material characterized by a plurality of parameters including refractive index dispersion $\alpha$, $\Delta n \cdot d$ which is the product of refractive index anisotropy $\Delta n$ and the layer thickness d, and twist angle;
  compensating means adjacent to the liquid crystal cell for compensating for the color of the display, the refractive index dispersion $\alpha$ of said compensating means being set on the basis of both the refractive index dispersion $\alpha$ and $\Delta n \cdot d$ of said liquid crystal cell.
  wherein the incident linearly polarized light into the liquid crystal cell is transformed into elliptically polarized light after passing through the liquid crystal cell, and the elliptically polarized light is converted back to linearly polarized light after passing through the compensating means in order to compensate for the color of said display so that the most suitable black and white display can be obtained.

40. The electro-optical device of claim 39, wherein the refractive index $\alpha$ is the ratio of $\Delta n$ at a first spectral wavelength to $\Delta n$ at a second spectral wavelength.

41. The electro-optical device of claim 39, wherein the compensating means includes at least one layer of an optically anisotropic material.

42. The electro-optical device of claim 39, wherein the compensating means is a twisted nematic liquid crystal cell.

43. The electro-optical device of claim 42, wherein the liquid crystal material in the compensating means is a super-twisted liquid crystal material.

44. The electro-optical device of claim 39, further including a pair of linear polarizers with one polarizer disposed adjacent to the liquid crystal cell means and the second of said polarizers disposed adjacent to the compensating means.

45. The electro-optical device of claim 39, wherein the liquid crystal material in the liquid crystal cell means has a twist angle between about 90° and 360°.

46. The electro-optical device of claim 39, wherein the compensating means has a twist angle of between about 0° to 400°.

47. The electro-optical device of claim 39, wherein the layer thickness d of the compensating means is greater than the layer thickness d of the liquid crystal cell means.

48. The electro-optical device of claim 39, wherein a nematic liquid crystal material serves as the compensating means.

49. The electro-optical device of claim 39, wherein $\Delta n \cdot d$ of the compensating means is less than $\Delta n \cdot d$ of the liquid crystal means.

* * * * *